United States Patent
Soundar

(10) Patent No.: US 8,964,963 B2
(45) Date of Patent: *Feb. 24, 2015

(54) SYSTEM AND METHOD FOR MAXIMIZING EFFICIENCY OF CALL TRANSFER SPEED

(71) Applicant: Micro Macro Assets LLC, Salem, NH (US)

(72) Inventor: Senraj Soundar, Salem, NH (US)

(73) Assignee: Micro Macro Assets, LLC, Salem, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/057,758

(22) Filed: Oct. 18, 2013

(65) Prior Publication Data
US 2014/0044253 A1  Feb. 13, 2014

Related U.S. Application Data

(63) Continuation of application No. 13/278,764, filed on Oct. 21, 2011, now Pat. No. 8,594,308.

(60) Provisional application No. 61/405,587, filed on Oct. 21, 2010.

(51) Int. Cl.
*H04M 3/00* (2006.01)
*H04M 5/00* (2006.01)
(Continued)

(52) U.S. Cl.
CPC ............ *H04M 3/523* (2013.01); *H04M 3/5158* (2013.01); *H04M 3/5183* (2013.01);
(Continued)

(58) Field of Classification Search
CPC ..................... H04M 2201/14; H04M 2201/38; H04M 2203/357; H04M 2203/404; H04M 3/5158; H04M 3/5183; H04M 3/523; H04M 3/58

USPC ............ 379/265.01, 265.02, 265.03, 265.04, 379/265.05, 265.06, 265.07, 265.08, 379/265.09, 265.1, 265.11, 265.12, 265.13, 379/265.14, 266.01, 266.02, 266.03, 379/266.04, 266.05, 266.06, 266.07, 379/266.08, 266.09, 266.1

See application file for complete search history.

(56) References Cited

U.S. PATENT DOCUMENTS 5,822,400 A * 10/1998 Smith .......................... 379/32.02
6,141,412 A * 10/2000 Smith et al. .............. 379/265.14

(Continued)

OTHER PUBLICATIONS

International Search Report and Written Opinion for PCT/US14/23417, dated Jul. 14, 2014.

*Primary Examiner* — Khai N Nguyen
(74) *Attorney, Agent, or Firm* — Peter A. Nieves; Sheehan Phinney Bass + Green PA

(57) ABSTRACT

A system and method for maximizing efficiency of call transfer from being between a customer and a dialing agent, to being between the customer and a talker is provided. The method contains the steps of: entering a dialing agent and a talker into a campaign to maintain direct communication with the dialing agent and with the talker; calling a customer via use of a dialing agent device; receiving from the dialing agent a request to transfer a connected customer from communicating with the dialing agent to communicating with a talker; and after receiving the request to transfer, transmitting an identification of a customer record associated with the connected customer to a talker computer for identifying the customer record, where the customer record has been previously stored on the talker computer prior to receiving the request to transfer.

68 Claims, 16 Drawing Sheets

(51) Int. Cl.
*H04M 3/523* (2006.01)
*H04M 3/51* (2006.01)
*H04M 3/58* (2006.01)

(52) U.S. Cl.
CPC ............ *H04M 3/58* (2013.01); *H04M 2201/14* (2013.01); *H04M 2201/38* (2013.01); *H04M 2203/357* (2013.01); *H04M 2203/404* (2013.01)
USPC ............ 379/265.11; 379/265.01; 379/265.02; 379/266.1

(56) References Cited

U.S. PATENT DOCUMENTS

| | | | |
|---|---|---|---|
| 6,721,778 B1 * | 4/2004 | Smith et al. | 718/103 |
| 6,751,310 B1 | 6/2004 | Crossley | |
| 7,068,642 B1 * | 6/2006 | Khan | 370/352 |
| 7,092,509 B1 | 8/2006 | Mears et al. | |
| 7,873,156 B1 | 1/2011 | Blair | |
| 7,873,157 B1 * | 1/2011 | Sim | 379/266.08 |
| 8,284,920 B2 | 10/2012 | Shaffer | |
| 8,576,835 B2 | 11/2013 | Acharya | |
| 2004/0098480 A1 | 5/2004 | Sekizawa | |
| 2004/0179672 A1 * | 9/2004 | Pagel et al. | 379/266.1 |
| 2005/0002515 A1 | 1/2005 | Mewhinney et al. | |
| 2007/0121902 A1 | 5/2007 | Stoica et al. | |
| 2010/0303225 A1 * | 12/2010 | Shashkov et al. | 379/265.11 |
| 2011/0103572 A1 | 5/2011 | Blair | |
| 2011/0286592 A1 * | 11/2011 | Nimmagadda | 379/266.06 |

* cited by examiner

SYSTEM AND METHOD FOR MAXIMIZING EFFICIENCY OF CALL TRANSFER SPEED

CROSS-REFERENCE TO RELATED APPLICATIONS

This application is a continuation of and claims priority to U.S. Application entitled, "SYSTEM AND METHOD FOR MAXIMIZING EFFICIENCY OF CALL TRANSFER SPEED" having Ser. No. 13/278,764, now U.S. Pat. No. 8,594,308, filed Oct. 21, 2011, which claims priority to expired U.S. Provisional Application entitled "SYSTEM AND METHOD FOR MAXIMIZING EFFICIENT CALL TRANSFER SPEED", having Ser. No. 61/405,587, filed Oct. 21, 2010, both of which are entirely incorporated herein by reference.

FIELD OF THE INVENTION

The present invention is generally related to call centers, and more particularly, is related to efficient handling of call center calls.

BACKGROUND OF THE INVENTION

Systems and methods presently exist for transferring a customer call taking place between a dialing agent and a customer, to taking place between a talker and a customer, without the customer knowing that a dialing agent was involved in completing the call between the talker and customer, and without the customer knowing that navigating systems and people (phone voice menus, operators, wrong phone numbers and the like) were involved prior to getting the live customer on the phone. Many of these systems and methods transfer the call between the dialing agent and the customer to between the talker and the customer fast enough, without significant delay. Unfortunately, these systems and methods transfer and display customer data at the screen of the talker at the same time as when the call is transferred or a short time after the call is transferred. Specifically, to allow the talker to have a productive call with the customer, it is beneficial for the talker to view data regarding the customer. Since the customer data is displayed at the same time as when the call is transferred or a short time after the call is transferred, the talker is at a disadvantage and not capable of preparing to handle the call effectively ahead of time.

The foregoing fact causes the talker to react to a transferred call with a delay since the talker has to review the customer data after the call is transferred. In addition, the foregoing facts reduce effectiveness of the talker in performing the important objectives of: 1) making sure that the customer does not know that there was a dialing agent involved in making the call; and, 2) being prepared to pitch the customer effectively based on past notes regarding a history and facts regarding the customer. Therefore, there is a need for a system and method that allows the talker to be prepared prior to when the customer call is transferred.

Prior systems and methods also transfer all attributes of customer data when a call is transferred. Such transfer of all attributes of customer data through the network is burdensome and takes time, which in turn introduces delay in transferring customer data. Such delay causes slowness in the talker responding when the call is actually transferred. Thus, there is a need for a system and method that minimizes the amount of customer data that needs to be transferred through the network, thereby increasing the speed of data transfer.

Prior systems and methods also have multiple talkers. The decision to select a specific talker is made at the time that the call is transferred, which is burdensome and takes time, which in turn introduces additional delay in transferring the call. Such delay causes the talker not to engage the customer quickly, which can negatively affect the call. Thus, there is also a need for a system and method that minimizes the delay associated with selection of the talker.

SUMMARY OF THE INVENTION

Embodiments of the present invention provide a system and method for maximizing efficiency of call transfer from being between a customer and a dialing agent to being between the customer and a talker. Briefly described, in architecture, one embodiment of the system, among others, can be implemented as follows. One embodiment of the system contains a dialing agent computer, a talker computer, a central data server, and a central voice server. The dialing agent computer has a memory, and a processor configured by the memory to provide a notification that a dialed customer has been connected (referred to herein as a connected customer) via a call and is ready for a call transfer, wherein the dialing agent computer is used by a dialing agent. The talker computer has a memory, and a processor configured by the memory to receive a first customer identification associated with the dialed customer prior to or at the same time as dialing of the customer and to receive a second customer identification associated with the connected customer after the connected customer has been connected to the dialing agent, wherein the talker computer is used by a talker. The central data server contains a memory, and a processor configured by the memory to perform the steps of: receiving the notification from the dialing agent computer confirming that the dialed customer has been connected; transferring the first customer identification associated with the dialed customer to the talker computer prior to or at the same time as dialing the dialed customer for purposes of highlighting a customer record on the talker computer in a first manner; and after the dialing agent computer acknowledges connection to the dialed customer, transferring the second customer identification associated with the connected customer to the talker computer for purposes of highlighting a customer record on the talker computer in a second manner. Prior to the dialing agent providing the notification that the dialing agent is dialing the dialed customer, the talker computer has stored therein data associated with the connected customer.

The present invention can also be viewed as providing methods for maximizing efficiency of call transfer from being between a customer and a dialing agent, to being between the customer and a talker. In this regard, one embodiment of such a method, among others, can be broadly summarized by the following steps: entering a dialing agent and a talker into a campaign to maintain direct communication with the dialing agent and with the talker; calling a customer via use of a dialing agent device; receiving from the dialing agent a request to transfer a connected customer from communicating with the dialing agent to communicating with a talker; and after receiving the request to transfer, transmitting an identification of a customer record associated with the connected customer to a talker computer for identifying the customer record, where the customer record has been previously stored on the talker computer prior to receiving the request to transfer.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 11 is an example of a screenview illustrating an interface provided to a talker after the talker joins a campaign using the talker computer, and after the talker has joined the voice conference bridge using the talker telephone.

FIG. 16 is an example of a screenview illustrating an interface provided to talker when a transferred customer's record is shaded differently to differentiate from the other two customer records that are being dialed.

DETAILED DESCRIPTION

Figure 1:
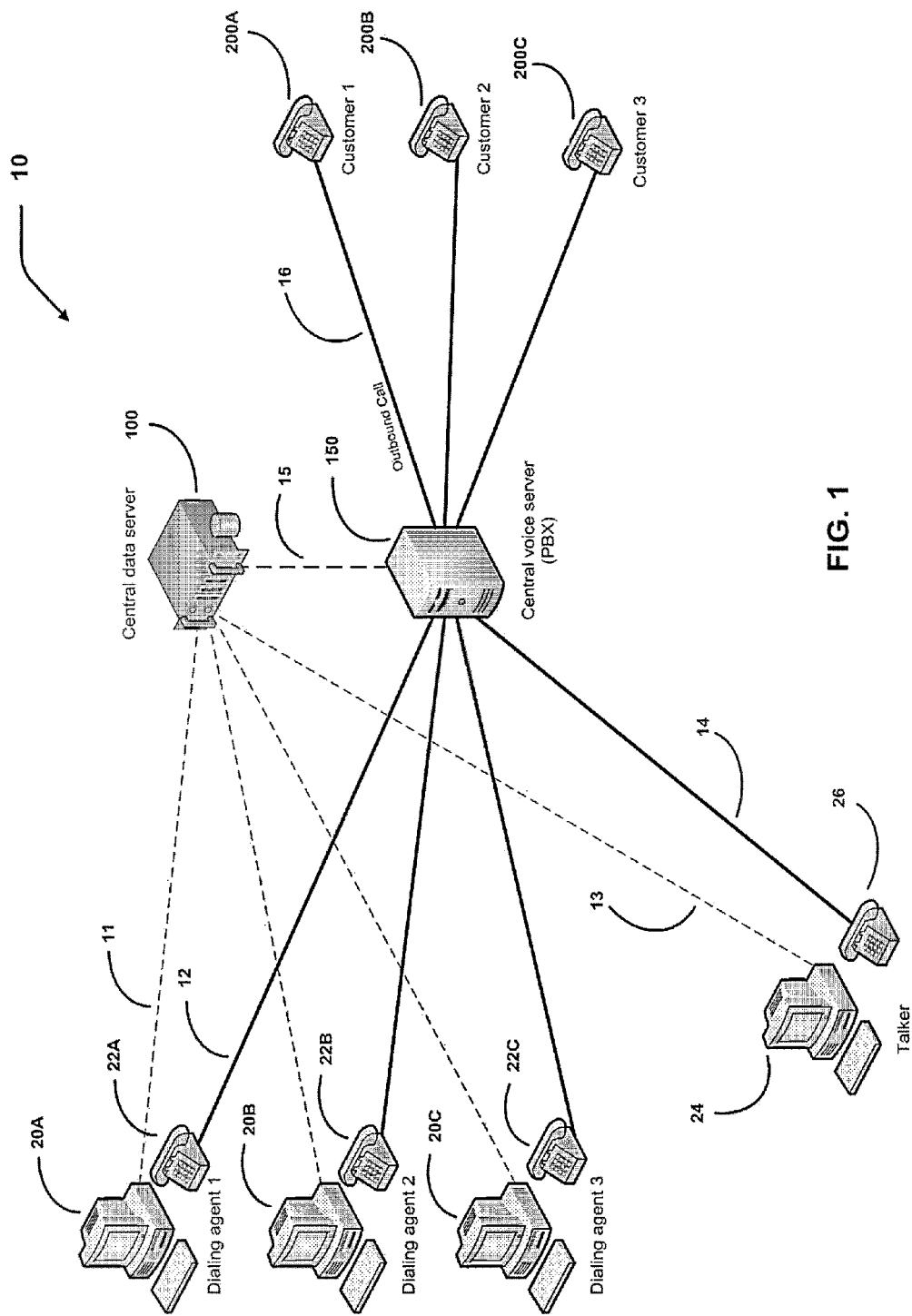
FIG. 1 is a schematic diagram illustrating a system for maximizing efficiency of call transfer speed in accordance with the present invention.

The present invention provides a system and method for maximizing speed of transferring a call from taking place between a dialing agent and a customer, to taking place between a talker and a customer, by providing customer data to the talker ahead of the call transfer, minimizing the amount of customer data transferred, and minimizing the delay associated with talker selection at the time of call transfer by knowing ahead of time which talker to transfer the call to. Each of the foregoing techniques, as described in detail herein, could be used individually, or collectively two or more techniques could be used together. Customer data is displayed in a talker screen ahead of call transfer allowing the talker to be prepared by reviewing customer data, such as, for example, notes history and the like, ahead of call transfer. Only a necessary minimal amount of data providing a unique identifier is transferred to the talker when the call is being transferred, thereby increasing speed of call transfer. The delay associated with selecting the available talker at the time of call transfer is minimized by pre-selecting the talker ahead of call transfer and having the talker wait in a voice server and ready to accept the transferred call.

While the following describes the present system and method in detail it is beneficial to provide certain definitions.

Customer: A person to whom a telephone call is made.

Customer list: A list of customers.

Dial: A telephone call made to a customer in the customer list.

Connect: A telephone call answered by a live customer.

Dialing agent: Each person who is the first person that handles a call made to a customer and navigates the call (through phone voice menus, phone operators, voicemails, wrong phone numbers, and the like) until the call reaches the correct target customer on the customer list, while the system may dial the telephone number of the customer and establishes connection between the person's phone and customer in the customer list, where the person transfers a live customer call to a talker, via a central voice server.

Talker: The person waiting in a voice conference bridge who accepts a transferred telephone call and speaks to a customer after the transfer of the telephone call.

Campaign: The session when the dialing agent and the talker work together, in which the dialing agent, via a central voice server, dials the customers and transfers the call between the dialing agent and the customer to the call between the talker and the customer.

Dialing Agent Software: The software component of a dialing agent computer that provides functionality necessary for performance by the dialing agent, in accordance with the present system and method.

Talker Software: The software component of a talker computer that provides functionality for performance by the talker, in accordance with the present system and method.

It should be noted that whenever the present description refers to a step being performed by a dialing agent, based on the context, this means that the step is either performed by: i) a dialing agent through the use of dialing agent software; ii) a dialing agent through the use of a dialing agent telephone; or iii) dialing agent software automatically without a dialing agent initiating a step. This same reasoning pertains to steps performed by the talker.

FIG. 1 is a schematic diagram illustrating a system 10 for maximizing the efficiency of the call transfer speed through communicating customer data to the talker ahead of call transfer, minimizing data transfer delay, and minimizing talker selection delay, in accordance with the present invention. Referring to FIG. 1, the system 10 includes a dialing agent computer 20 having dialing agent software stored therein, a dialing agent telephone 22, a talker computer 24 having talker software stored therein, a talker telephone 26, a central data server 100, a central voice server 150, and a customer telephone 200.

Figure 2:
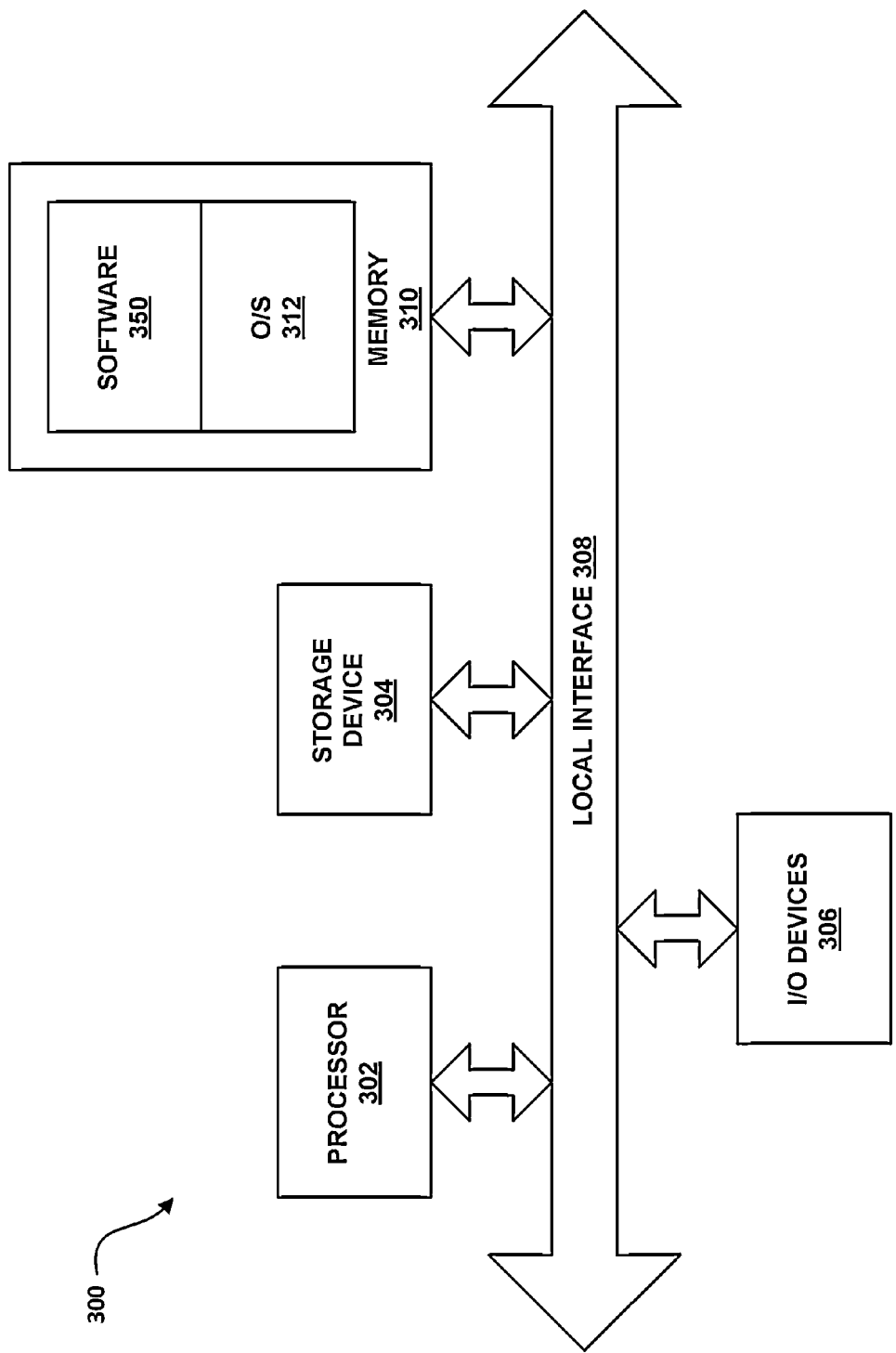
FIG. 2 is a block diagram further illustrating a general purpose computer.

It should be noted that a computer may be any device having a memory and processor, and being able to store therein functionality associated with software. Examples of computers may include, but are not limited to, a desktop computer, a portable computer such as a laptop computer, or a personal data assistant. FIG. 2 is a block diagram further illustrating a general purpose computer. It should be noted that functionality of the present system and method can be implemented in software, firmware, hardware, or a combination thereof.

Returning to FIG. 1, within the system 10 there may be one or more than one dialing agent computer 20, dialing agent telephone 22, talker computer 24, talker telephone 26, central data server 100, central voice server 150, and/or customer telephone 200. For exemplary purposes, FIG. 1 illustrates three dialing agent computers 20A, 20B, 20C, three dialing agent telephones 22A, 22B, 22C, and three customer telephones 200A, 200B, 200C.

In accordance with the present invention, a telephone can be a traditional analog hardware telephone, digital hardware telephone, a software telephone (such as session initiation protocol (SIP) client software), or the like that could be used to communicate human voice. Since the capability of a telephone could potentially be implemented using a piece of software executed in a computer, the telephone and computer need not be two different devices and instead, both can be in one computer device.

The central voice server 150 can be a traditional PBX (Private Branch Exchange) that has the capability of performing switching functions based on commands received through CTI (Computer Telephony Interface) or software based PBX, or the like.

In accordance with the present invention, the central data server 100 contains components similar to a computer, such as, but not limited to, a memory, processor, local bus, input/output devices, and a storage device. A detailed description of a generic computer structure is provided hereinbelow. Of course, the storage capability and structure of the storage device within the central data server 100 may be different from that of a standard generic computer storage device, however, one having ordinary skill in the art would know such structure and differences. In accordance with the first exemplary embodiment, the central data server 100 may store therein a list of customers for contacting, as well as data regarding the customers. Such data may include data that is typically used in marketing such as, but not limited to, account name, contact full name, address, phone number, date last contacted, notes regarding results of the last communication, and other data.

Since the capability of the central voice server 150 could be implemented using software executed in a computer, the central data server 100 and central voice server 150 need not be two different devices and instead both could be in one computer.

Telephone communication links 12, 14, and 16 could be implemented using traditional analog telephone lines or digital telephone lines utilizing various digital communication protocols such as SIP, PRI (Primary Rate Interface), or the like. In addition, computer communication links 11 and 13 could be implemented using a LAN (Local Area Network), a WAN (Wide Area Network), mobile network, or the like. A central server communication link 15 may also be provided for communication between the central data server 100 and the central voice server 150. The central server communication link 15 can be implemented using computer communication links or phone communication links described above.

One having ordinary skill in the art would understand the various types of devices, types of telephone communication links, and computer communication links that could be used in a system 10 embodying the present invention, and that other such devices and links may be provided.

FIG. 2 is a block diagram further illustrating a general purpose computer 300. Generally, in terms of hardware architecture, as shown in FIG. 2, the computer 300 includes a processor 302, memory 310, storage device 304, and one or more input and/or output (I/O) devices 306 (or peripherals) that are communicatively coupled via a local interface 308. The local interface 308 can be, for example but not limited to, one or more buses or other wired or wireless connections, as is known in the art. The local interface 308 may have additional elements, which are omitted for simplicity, such as controllers, buffers (caches), drivers, repeaters, and receivers, to enable communications. Further, the local interface 308 may include address, control, and/or data connections to enable appropriate communications among the aforementioned components.

The processor 302 is a hardware device for executing software, particularly that stored in the memory 310. The processor 302 can be any custom made or commercially available processor, a central processing unit (CPU), an auxiliary processor among several processors associated with the computer 300, a semiconductor based microprocessor (in the form of a microchip or chip set), a macroprocessor, or generally any device for executing software instructions.

The memory 310 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 310 may incorporate electronic, magnetic, optical, and/or other types of storage media. Note that the memory 310 can have a distributed architecture, where various components are situated remote from one another, but can be accessed by the processor 302.

The software 350 in the memory 310 may include one or more separate programs, each of which contains an ordered listing of executable instructions for implementing logical functions of the system, as described below. As an example, in the case of the dialing agent computer 20, the software 350 would contain an ordered listing of executable instructions for implementing logical functions required of the dialing agent computer 20, as described below. In addition, in the case of the talker computer 24, the software 350 would contain an ordered listing of executable instructions for implementing logical functions required of the talker computer 24, as described below. Further, in the case of the central data server 100, the software 350 would contain an ordered listing of executable instructions for implementing logical functions required of the central data server 100, as described below.

It should be noted that in accordance with an alternative embodiment of the invention, software of the dialing agent computer 20, software of the talker computer 24, and software of the central data server 100 may instead be one software package having separate modules to perform functionality of the dialing agent computer 20, the talker computer 24, and the central data server 100, respectively.

Although not required, it is possible for the memory 310 to contain an operating system (O/S) 312. The operating system 312 essentially controls the execution of computer programs and provides scheduling, input-output control, file and data management, memory management, and communication control and related services.

Functionality of the computer may be provided by a source program, executable program (object code), script, or any other entity containing a set of instructions to be performed. When a source program, then the program needs to be translated via a compiler, assembler, interpreter, or the like, which may or may not be included within the memory 310, so as to operate properly in connection with the O/S 312. Furthermore, functionality of the computer can be written as (a) an object oriented programming language, which has classes of data and methods, or (b) a procedure programming language, which has routines, subroutines, and/or functions.

The I/O devices 306 may include input devices, for example but not limited to, a microphone, a keyboard, mouse, scanner, joystick or other input device. Furthermore, the I/O devices 306 may also include output devices, for example but not limited to, a display, or other output devices. The I/O devices 306 may further include devices that communicate via both inputs and outputs, for instance but not limited to, a modulator/demodulator (modem; for accessing another device, system, or network), a radio frequency (RF) or other transceiver, a telephonic interface, a bridge, a router, or other devices that function both as an input and an output.

When the computer 300 is in operation, the processor 302 is configured to execute the software 350 stored within the memory 310, to communicate data to and from the memory 310, and to generally control operations of the computer 300 pursuant to the software 350. The software 350 and the O/S 312, in whole or in part, but typically the latter, are read by the processor 302, perhaps buffered within the processor 302, and then executed.

When the functionality of the computer is implemented in software, as is shown in FIG. 2, it should be noted that the functionality can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The functionality can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the functionality of the computer is implemented in hardware, the functionality can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), or other technologies.

Figure 3:
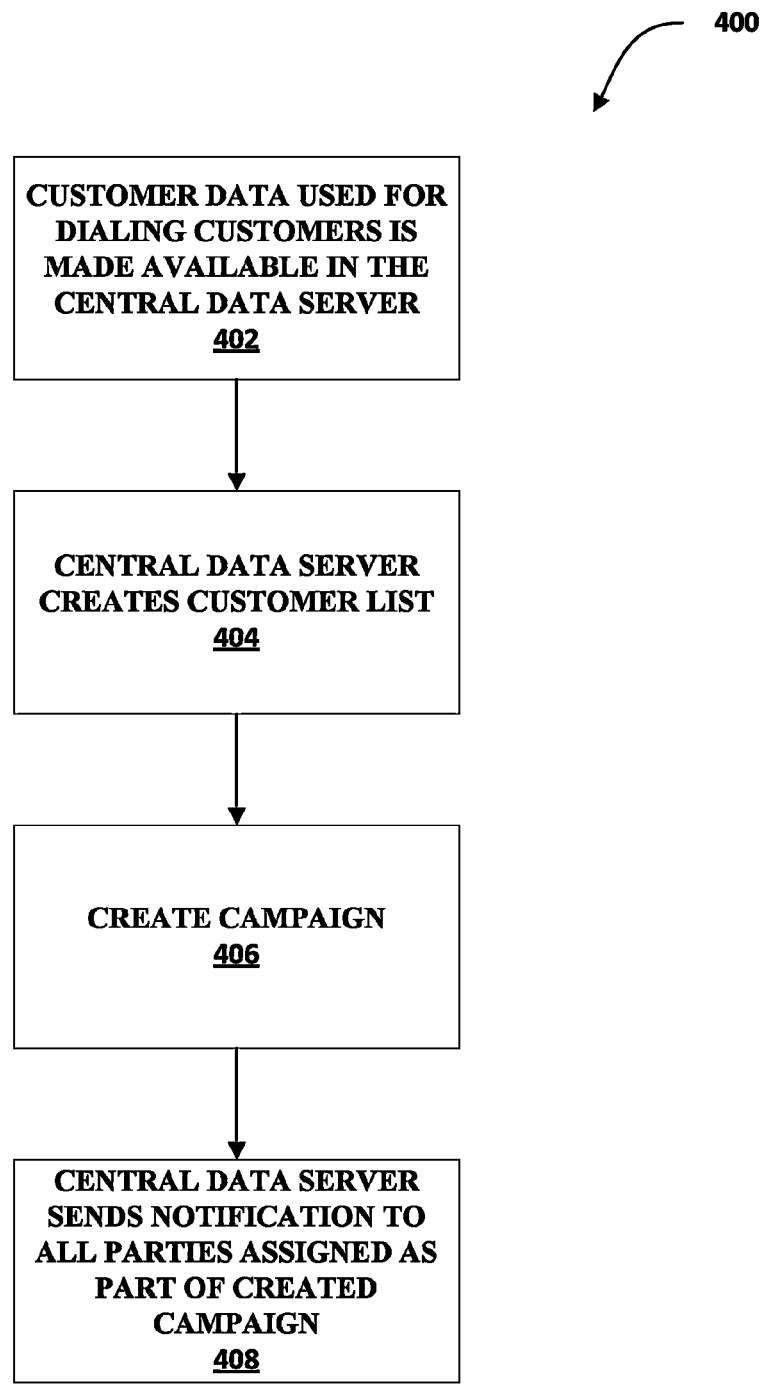
FIG. 3 is a flowchart illustrating an initiation process performed by the central data server of FIG. 1, in accordance with the first exemplary embodiment of the present invention.

FIG. 3 is a flowchart 400 illustrating an initiation process performed by the central data server 100 in order to maximize efficiency in call transfers. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention. In addition, it may be the case that a function may be skipped.

As shown by block 402, customer data that is used for dialing customers is made available in the central data server 100. Customer data may be imported into the central data server 100 one or more customer records at a time from one or more file, or each customer record of the customer data may be individually entered directly into the central data server 100. One having ordinary skill in the art would appreciate that other methods may be used to populate customer data into the central data server 100.

As shown by block 404, the central data server 100 creates a customer list for use in a campaign. Creation of the customer list is based on specific criteria that is important to selecting an appropriate customer for marketing purposes. As an example, if calls are being made for purposes of speaking with potential purchasers of male shaving products, it might be beneficial to have the customer list include only males over the age of sixteen. As a way of another example, if calls are being made for purposes of speaking with potential purchasers of office supplies, it might be beneficial to have the customer list include only customers whose job function is related to purchasing office supplies for their businesses. The central data server 100 may use any known methods for creating the customer list, such as, but not limited to, indexing the customer list based upon key words and querying the customer list based on specific search criteria.

Figure 4:
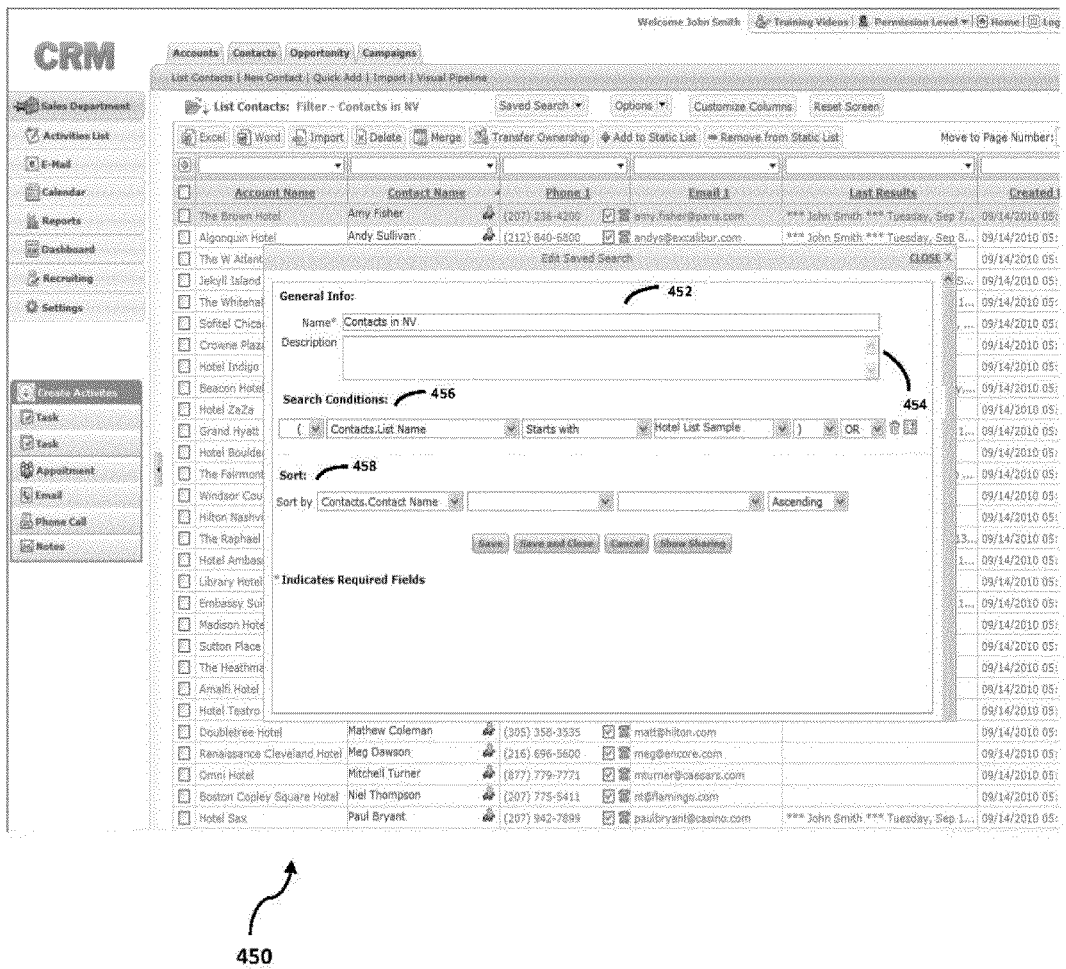
FIG. 4 is an exemplary screen view illustrating an interface for creating a customer list based on specific search criteria, which may be viewed by a party logging into the central data server and selecting to create a customer list.

The customer list may be created by a user of the present system. As an example, a talker may log into the central data server 100, via use of the talker computer 24 and associated software, for creating of a customer list. FIG. 4 is an exemplary screen view illustrating an interface 450 for creating a customer list based on specific search criteria, which may be viewed by a party logging into the central data server 100 and selecting to create a customer list. As shown by FIG. 4, the interface 450 contains a name field 452 for providing a name for the customer list, a description field 454 for describing the customer list, a search condition field 456 for specifying how to search the customers within the central data server 100 in creating the customer list, and a sort field 458 for sorting the resulting customers. It should be noted that there could be more than one search condition field and more than one sort field.

Returning to FIG. 3, as shown by block 406, a campaign may be created. A campaign is created by a user of the central data server 100 selecting to create a campaign and the central data server 100 creating the campaign after the user has provided specific requested information for creation of the campaign. As an example, the user may be a talker that logs into the central data server 100, via use of the talker computer 24 and associated software, for creating a campaign. In creating the campaign, dialing agents, talkers, and time slots are selected. A campaign may be created in the system by scheduling specific time with one or more dialing agents to dial a specific customer list, transfer calls to specific talkers, and update the customer information.

Figure 5:
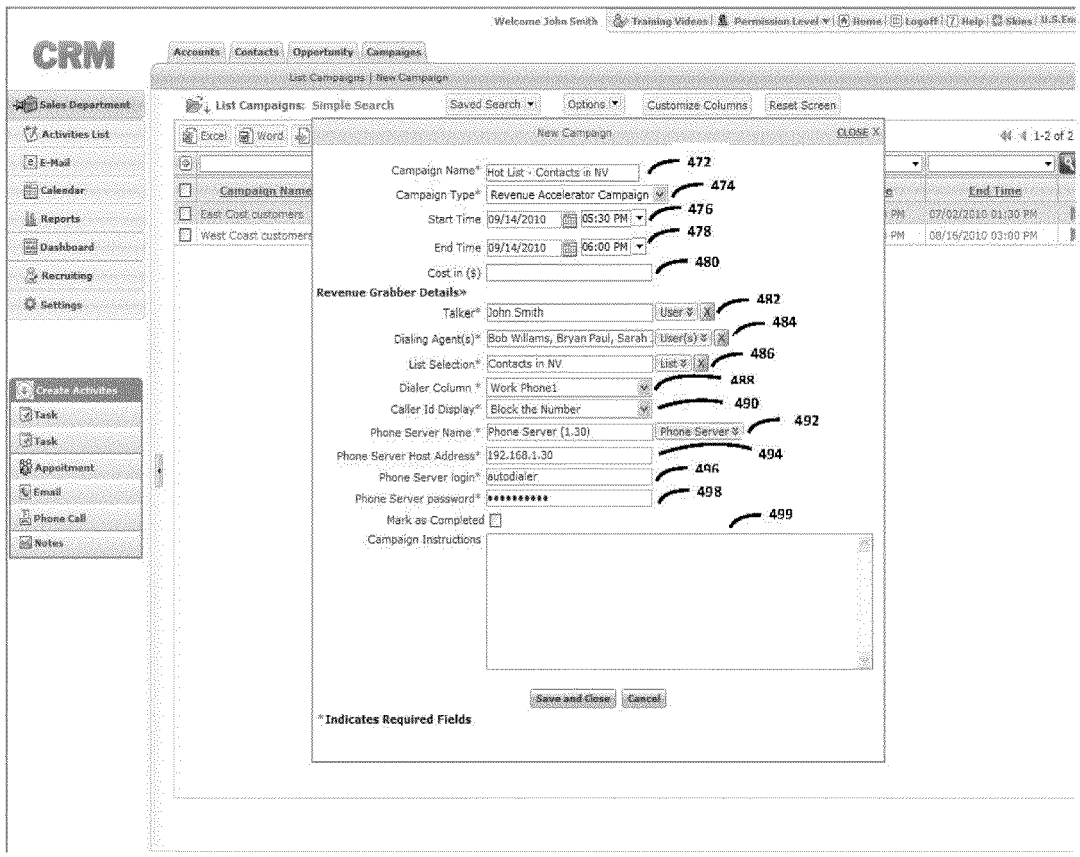
FIG. 5 is an exemplary screen view illustrating an interface for creating and scheduling a campaign specifying one or more talker and one or more dialing agent.

FIG. 5 is an exemplary screen view illustrating an interface 470 for creating and scheduling a campaign specifying one or more talker and one or more dialing agent. As shown by FIG. 5, the interface 470 contains: a campaign name field 472, for identifying the name of the campaign; a campaign type field 474, for identifying the type of campaign for classification and reporting purposes; a start time field 476 for defining the start time of the campaign (date and time in the day); an end time field 478 for defining the end time of the campaign (data and time in the day); a cost field 480 for defining the cost associated with a campaign and tracking the budget against a specific type of campaigns; a talker field 482 for identifying one or more talkers for the campaign; a dialing agent field 484 for identifying one or more dialing agents for the campaign; and, a list selection field 486 for identifying specific pre-defined lists that may be of interest to the campaign creator (such as the example shown of the contacts in Nevada).

The interface 470 also contains: a dialer column field 488 for defining which column in the customer record should be used to obtain the phone number to dial the customer; a called ID display field 490 for specifying whether or not a specific caller identification should be displayed to the customer during a telephone call; a phone server name field 492 for defining which central voice server should be used for the campaign; a phone server host address field 494 for defining the computer host address (for example not limited to, IP address or hostname within a domain) of the central voice server; a phone server login field 496 for defining a login required for use by the dialing agent and talk to enter a campaign; a phone server password field 498 for use by the dialing agent and talker to enter a campaign; and a campaign instructions field 499 for providing any specific instructions (optional) that could be used by the dialing agents or other users of the system.

It should be noted that when a campaign is created, a talker may specify whether to block or unblock the caller ID when the dialing agent is dialing customers during that campaign. If the caller ID is unblocked the talker is allowed to select a list of caller IDs allocated for that campaign and when a customer is dialed by a dialing agent, the central voice server 150 displays a specific caller ID picked from the list of caller IDs selected by the talker for that campaign. It should be noted that based on the implementation preferences, when a customer is dialed the central data server 100 may pick such a specific caller ID by using techniques such as, but not limited to, round robin, random selection, or the like and send such caller ID to the central voice server 150 directly or indirectly through the dialing agent computer 20.

Returning to FIG. 3, as shown by block 408, the central data server 100 sends a notification to all parties who are assigned as part of the created campaign. As an example, the central data server 100 may transmit electronic mail (email) to each dialing agent and talker identified by the campaign. In addition, a calendar event may be transmitted to each dialing agent and talker identified by the campaign, for populating calendar software on the dialing agent computer 20 and talker computer 24. It should be noted that the notifications may instead be transmitted to personal devices of the dialing agents and talkers, such as to their cellular telephone or personal data assistant.

In an alternative embodiment of the present invention, a campaign could be created with minimal information to just schedule the time slot for the talker and dialing agents, and the other campaign details (for example but not limited to the customer list, caller id blocking or unblocking, which central voice server to be used) could be finalized just before starting the campaign, if required at all. A person having ordinary skill in the art would know how to modify the interface 470 or to divide the interface into multiple interfaces to implement this embodiment. For example, the campaign details that are not captured during the time of campaign creation could be captured using one or more interface screens just before the talker starting the campaign and then the talker may proceed to start the campaign.

Figure 6:
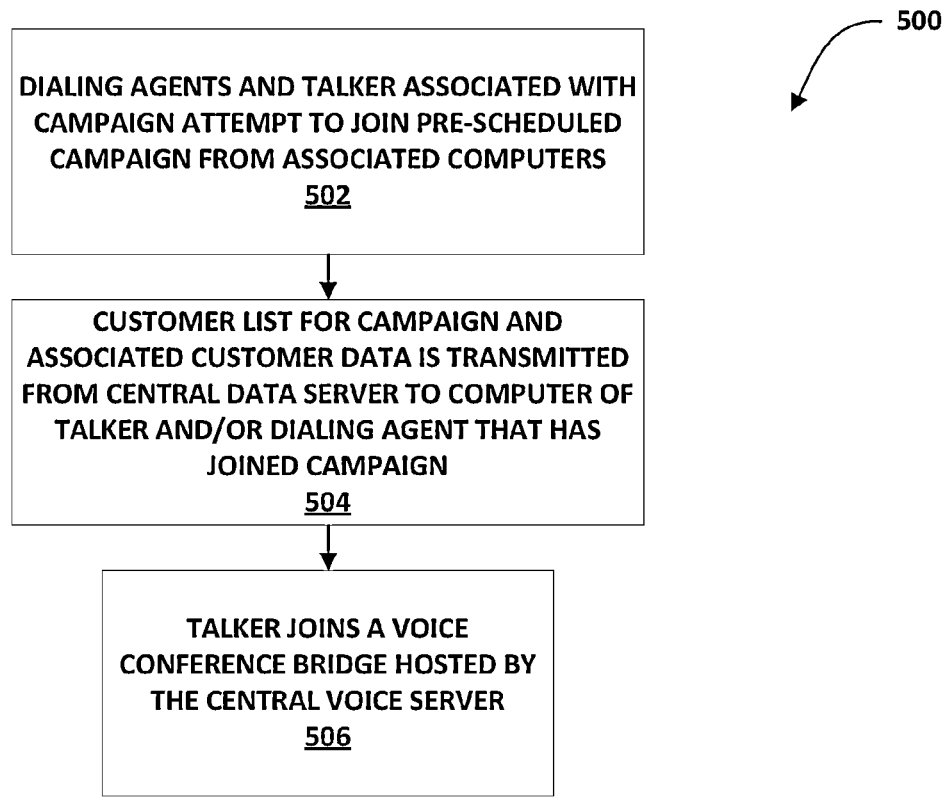
FIG. 6 is a flowchart illustrating a method for joining a campaign, in accordance with the first exemplary embodiment of the present invention.

FIG. 6 is a flowchart 500 illustrating a method for joining a campaign, in accordance with the first exemplary embodiment of the present invention. As shown by block 502, dialing agents and talker associated with a campaign attempt to join a pre-scheduled campaign from their associated computers. Upon the dialing agent attempting to join a specific campaign, the dialing agent computer 20 (through the dialing agent software) sends a request with the campaign identifier (associated with the specific campaign selected by the dialing agent) to the central data server 100 to join the campaign. Upon receiving such request to join the campaign, the central data server 100 checks whether the talker has already joined the campaign and, if the talker has not already joined the campaign the dialing agent is forced to wait until the talker joins the campaign and upon the talker joining the campaign the dialing agent is allowed to proceed with joining the campaign. Such mechanism provides flexibility to allow updates to the campaign specific settings (for example, but not limited to, caller ID block or unblock, customer list, etc) and updates to customer data (attributes of the customer data shown as part of the list such as customer account name, customer contact name, title, phone number, email, address, notes history and the like) until up to the moment prior to the talker joining the campaign.

In an alternative embodiment, based on implementation preferences, if the updates to campaign settings and customer data are allowed only until the campaign is created, the dialing agent may be allowed to join the campaign at any time after the campaign is created and need not be forced to wait until the talker joins the campaign.

Figure 7:
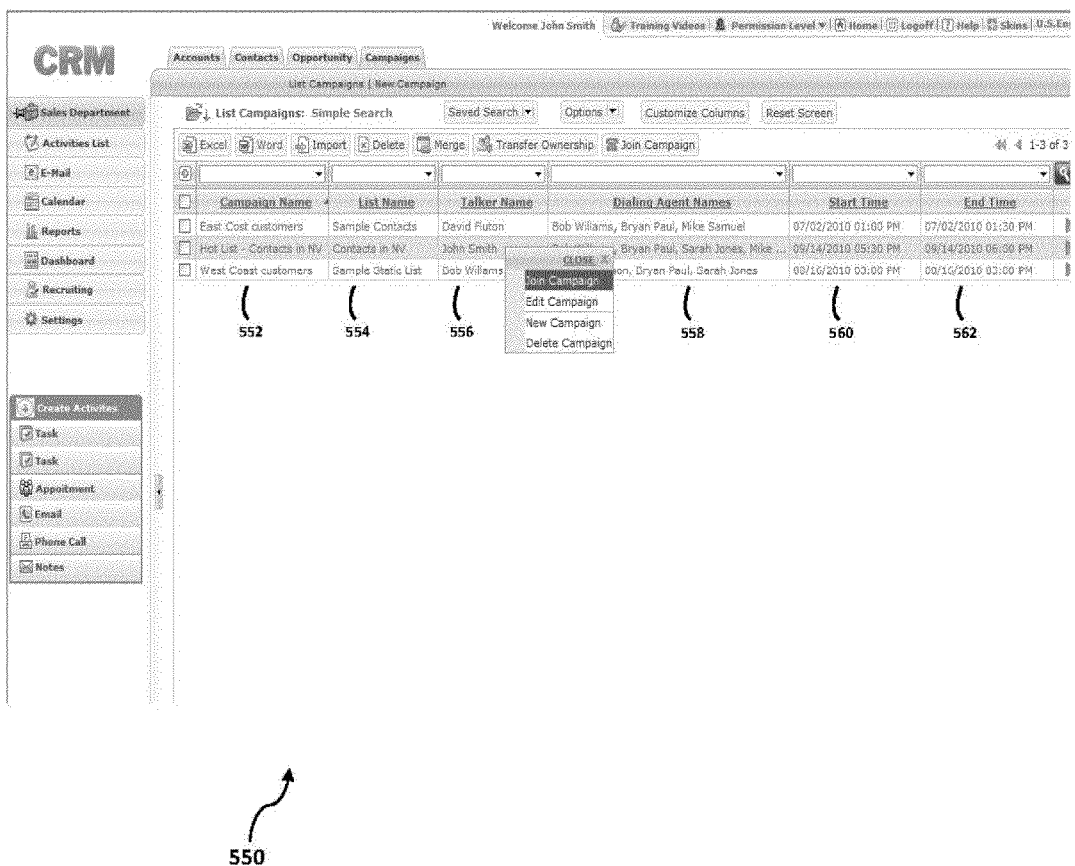
FIG. 7 is an exemplary screen view illustrating an interface for the dialing agent or talker to select and join a campaign.

The time schedule of the campaign could be used to schedule the availability of dialing agents and the talker, and such time schedule may or may not act as a restriction if the campaign is started at a time outside of the pre-scheduled time. FIG. 7 is an exemplary screen view illustrating an interface 550 for the dialing agent or talker to select and attempt to join a campaign. As shown by FIG. 7, the interface 550 contains: a campaign name field 552 for selecting the campaign to join; a list name field 554 for displaying the name of the list selected during creation of the campaign; a talker name field 556 for listing the talker(s) assigned to the campaign; a dialing agent name field 558 for displaying the dialing agent(s) assigned to the campaign; a start time field 560 for displaying the start time of the campaign; and, an end time field 562 for displaying the end time of the campaign.

Based on the implementation preferences, depending upon security level of the dialing agent and/or talker, the dialing agent and/or talker may be allowed to, including but not limited to, choose to join the campaign, edit the campaign, create a new campaign, or delete a campaign. While not required, requiring a login of the dialing agent and/or talker into the present system, via the central data server 100, provides for confirmation of identity.

Returning to FIG. 6, when a dialing agent and/or talker has joined the campaign, as shown by block 504, the customer list and associated customer data for the campaign (associated with the campaign identifier received as part of the request sent by dialing agent's computer to join the campaign) is transmitted from the central data server 100 to the computer of the dialing agent and/or talker that has joined the campaign. Transmission of the customer list and customer data is performed upon joining of the campaign to ensure that all data required during communication with a customer is located at the dialing agent computer 20 and the talker computer 24 prior to the dialing agent selecting to place a call to a customer on the customer list. Specifically, in accordance with the present system and method, the dialing agent computer 20 and the talker computer 24 contain the customer data prior to the dialing agent selecting to place a call.

In a further alternative embodiment, the central data server 100 may transmit to a dialing agent computer 20 only the portion of the customer data needed to perform the dialing agent's function and may transmit to the talker computer 24 only the portion of the customer data needed to perform the talker's function.

In the first exemplary embodiment of the present invention, the customer list and associated customer data may be forwarded at any time prior to beginning of the campaign, as long as the talker has the customer list (in the correct order consistent with the customer list in the dialing agent computer) and customer data on his computer prior to the dialing agent selecting to place a call to a customer.

In another alternative embodiment of the invention, the dialing agent could be allowed to join the campaign prior to, after, or at the same time as when the talker joins the campaign and flexibility could be provided to allow updates to certain portion of the campaign specific settings (for example, but not limited to, caller ID block or unblock, customer list, and other settings) and updates to customer data (attributes of the customer data shown as part of the list such as customer account name, customer contact name, title, phone number, email, address, notes history and the like) until up to the moment that the talker presses a "GO" button viewed by the talker computer 24 after joining the campaign. The foregoing flexibility could be achieved by transmitting the updated portion of the campaign specific settings and customer list (with customer data) from one component of the system 10 where an update might be taking place (for example, but not limited to, the talker computer 24) to other components of the system 10 that need to know such updates (for example, but not limited to, the dialing agent computer 20) upon the talker pressing the "GO" button.

In another alternative embodiment of the invention, having the dialing agent allowed to join the campaign prior to, after, or at the same time as when talker joins the campaign, flexibility could be provided to allow updates to take place to certain portion of the campaign specific settings and customer data until the time even after the talker has joined the campaign and pressed the "GO" button (that is allowing the updates to take place while the campaign is in progress). The foregoing flexibility could be accomplished by synchronizing the updates taking place in one component of the system 10 with the other components that need to know such updates in real time (or near real time) and the behavior of the system 10 could be modified in real time (or near real time). For example, while the campaign is in progress, the talker may recognize that a customer is not the correct target upon reviewing that customer record's notes history shown in the talker computer 24 and, therefore, the talker would set the do-not-call flag associated with that customer record. Such update is then propagated to the central data server 100, which in turn forces the central data server 100 not to select that particular customer record for dialing (if that customer record is yet to be dialed). As a way of another example, while the campaign is in progress the talker changes the caller ID for the campaign and such update is propagated to the central voice server 150 for use moving forward. It should be noted, based on implementation preferences, such updates may be propagated to the central data server 100 to allow central data server 100 to have stored therein the updated information for future use.

In another alternative embodiment, the dialing agent may be allowed to join the campaign before, after, or at the same time as, when the talker joins the campaign and the synchronization of updates takes place among different components of the system. Up until the talker presses the "GO" button to start the campaign, the central data server 100 may not transmit the customer list to the dialing agent computer 20 and the talker computer 24. Upon the talker pressing the "GO" button via use of the talker computer 24, the central data server 100 may select an initial batch of customer records for dialing and transmits such batch to the dialing agent computer 20 and the talker computer 24. Upon completing the dialing of a portion of the batch, the central data server 100 could select the next batch of customer records for dialing and transmit such next batch to the dialing agent computer 20 and talker computer 24 (and this cycle goes on until the entire customer list is exhausted or the campaign ends). Upon receiving each batch of customer records for dialing, the dialing agent computer 20 and talker computer 24 may append that batch with the currently shown customer records. Based on implementation preferences, to keep the computer memory utilization low, the previously dialed customer records (that are no longer needed to stay in dialing agent computer 20 and/or talker computer 24) associated with previous batches may be removed from the dialing agent computer 20 and talker computer 24. Each customer record could have associated priority information (located in one or more fields of the customer record) and the central data server 100 could use such priority information to decide on, including but not limited to, whether to move up or move down that customer record within the sequence of customer records selected dynamically for dialing through batches, how many times a specific customer record could re-appear allowing that customer record to be called multiple times with a campaign (or within a specific period of time), time gap between two consecutive calls to the same customer record, etc.

Still in accordance with the abovementioned alternative embodiment, based on implementation preferences, it should be noted that new customer records could be inserted and customer data (including but not limited to priority information) could be updated before starting the campaign or while the dialing session is in progress, by any user of the system and the central data server 100 may use the updated information as part of the logic used to select the customer records for dialing in the next batch of customer records. Further, the central data server 100 may use additional logic to move a particular customer record up or down the sequence of customer records selected dynamically for dialing through batches to make sure that multiple customer records whose calls will be going to the same phone operator are not appearing next to each other in the calling list. The foregoing flexibility may be required to avoid having multiple dialing agents calling the same phone operator concurrently. The central data server 100 may select a customer record for dialing only if the allowed-to-call checkbox is checked. If the allowed-to-call checkbox is checked, the central data server 100 may select a customer record only if the current date and time is equal to or after the date and time specified in the "do not call until" field in the customer record. Based on implementation preferences, a variation of the foregoing embodiment could be implemented by having the central data server 100 select only one customer record for dialing and transmit to the dialing agent computer 20 and talker computer 24, upon the dialing agent computer 20 requesting the next customer record for dialing. It should be noted that since the central data server 100 is sending each customer record itself only just before dialing, there is no need to send the customer unique ID separately to notify the customer record that is being dialed. If such newly received customer record is appended with other previously received customer records that were previously dialed as initiated by the dialing agent computer 20, the newly received customer record that is being dialed may need to be highlighted to show which customer record is currently being dialed. It should be noted that when multiple dialing agents are participating in the campaign there could be multiple customer records that are being dialed concurrently by multiple dialing agents and such multiple customer records that are currently being dialed could be transmitted to a talker computer 24 for displaying the customer records. If such newly received customer records are appended with other previously received customer records in the talker computer 24, the newly received customer records that are currently being dialed may need to be highlighted to differentiate the customer records that are being dialed from the previously received and previously dialed customer records. It should be noted that upon the dialing agent transferring a customer call, the associated customer record need to be highlighted differently in the talker computer 24 to differentiate the customer record that is transferred versus the customer records that are being dialed. Such notification of customer record whose call is transferred could be accomplished by transmitting the customer unique ID since the associated customer record has been transmitted previously when the dialing of that customer record began. A person having ordinary skill in the art would know the various techniques that could be used within the foregoing embodiment.

Returning to the first exemplary embodiment of the invention, the customer list associated with the particular campaign may be displayed in a tabular list on the computer 20 of each dialing agent associated with the campaign and on the computer 24 of the talker associated with the campaign. It should be noted that the list need not be tabular.

Figure 8:
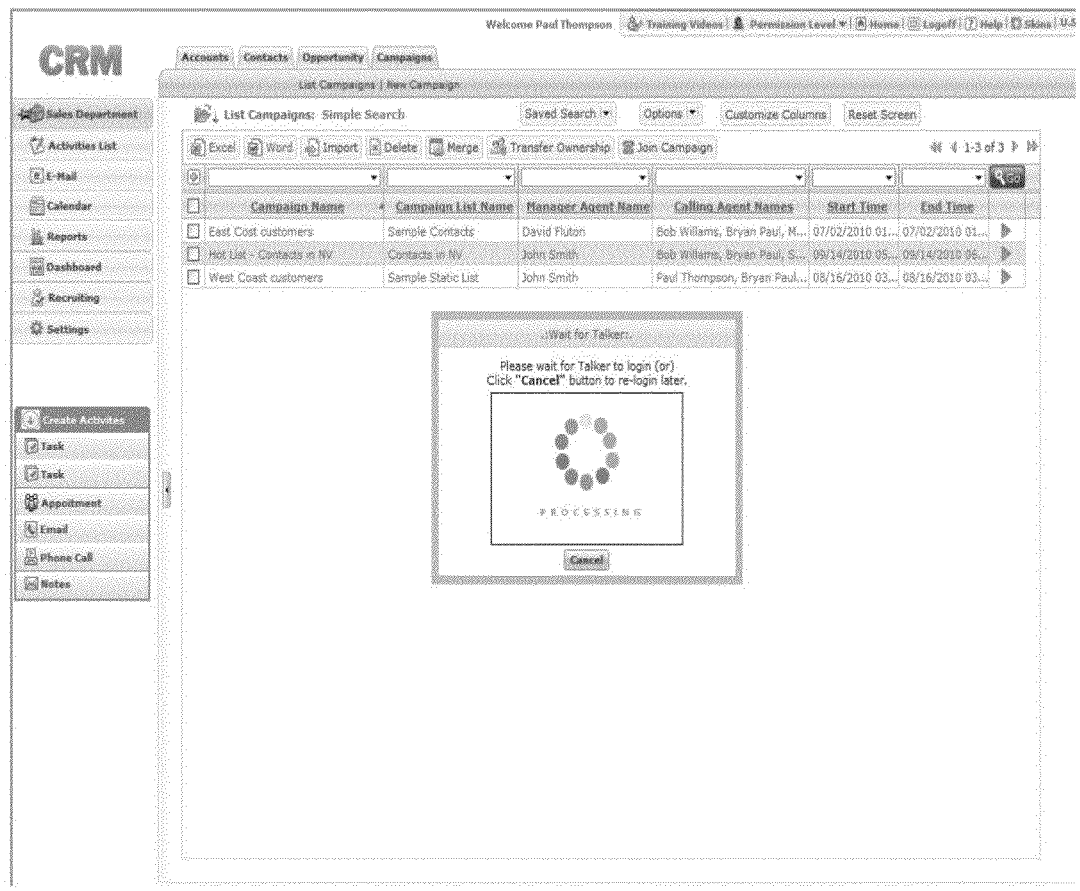
FIG. 8 is an example of a screenview illustrating an interface provided to a dialing agent while the dialing agent is attempting to join a campaign, where the dialing agent is forced to wait until the talker joins the campaign.

FIG. 8 is an example of a screenview illustrating an interface 590 provided to a dialing agent while the dialing agent is attempting to join a campaign, where the dialing agent is forced to wait until the talker joins the campaign. Alternatively, if the talker has joined the campaign, the dialing agents are allowed to join the campaign. This is assuming that there is only one talker and one or more dialing agent, however, it is noted that the present system and method may have one or more dialing agent and one or more talker in a campaign.

As shown by block 506, after joining the campaign through the talker computer 24, the talker joins a voice conference bridge hosted in the central voice server 150 by having the central voice server 150 call the phone number of the talker telephone 26 or by the talker manually calling the conference bridge phone number via use of the talker telephone 26. Upon joining the voice conference bridge, the talker may be listening to on hold music played in the conference bridge or the talker may simply be placed on hold.

Figure 9:
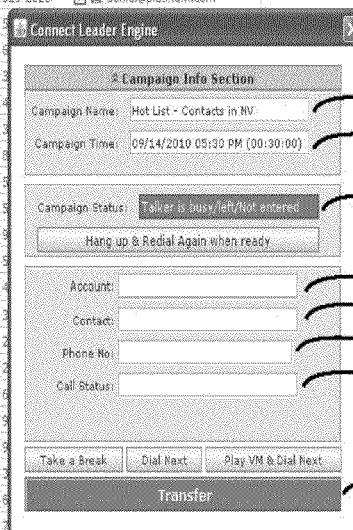
FIG. 9 is an example of a screenview illustrating an interface provided to a dialing agent after the talker joins the campaign.

FIG. 9 is an example of a screenview illustrating an interface 600 provided to a dialing agent after the dialing agent joining the campaign. As shown by FIG. 9, the interface 600 provides a view of the customer list associated with the campaign. Fields of the customer list include an account name field 602, a contact name field 604, a phone number field 606, an email field 608, a last result field 610 for identifying results of the last call and notes history, a created date field 612, and a contact status field 614 for keeping track of the status (for example, but not limited to, the sales status such as "interested to see demo", "proposal sent", "contract signed", etc). It is noted that the customer list and customer data are located on the dialing agent computer 20 prior to initiating customer dialing.

The interface 600 also contains a current status window 616 for identifying a current status of the campaign to the dialing agent. The current status window 616 contains: a campaign name field 618, which displays the name of the campaign that the dialing agent is assigned to; a campaign time field 620 for displaying the time at which the campaign is scheduled to begin; and a campaign status field 622 for displaying whether the campaign is ready to begin, if the campaign is not ready to begin, or if the campaign is on hold, such as due to the talker being busy, the talker having left the conference bridge, due to the talker not yet having entered the conference bridge, or due to the talker yet to press the "GO" button viewed by the talker computer 24 to start the campaign. The current status window 616 also contains: an account field 624 for listing the account name for the record currently being transferred; a contact field 626 for listing the contact currently being transferred; a phone number field 628 for listing the phone number of the contact currently being transferred; and, a call status field 630 for listing the current call status. The current status window 616 also contains a transfer button 632 for allowing the dialing agent to transfer a call to a talker, as is described in further detail hereinbelow.

Figure 10:
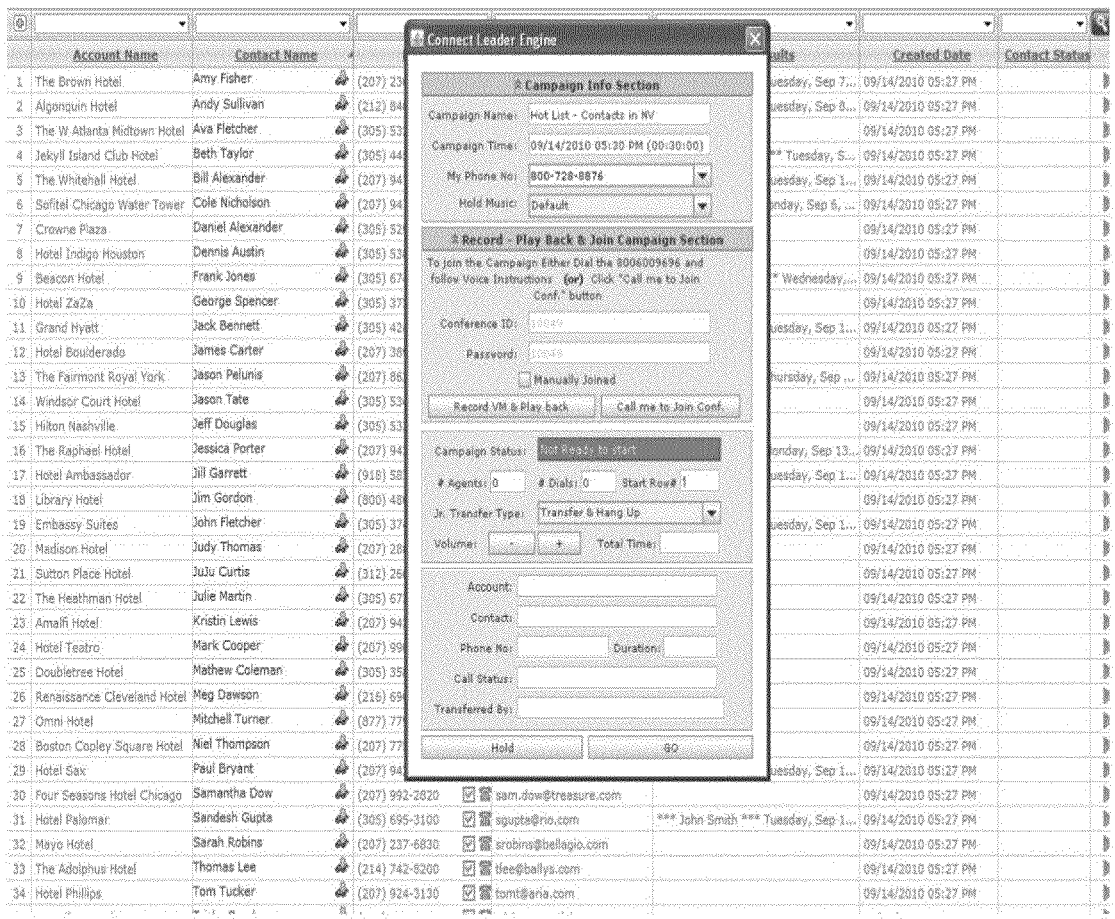
FIG. 10 is an example of a screenview illustrating an interface provided to a talker after the talker joins a campaign using the talker computer, but where the talker is yet to join the voice conference bridge using the talker telephone.
Figure 11:
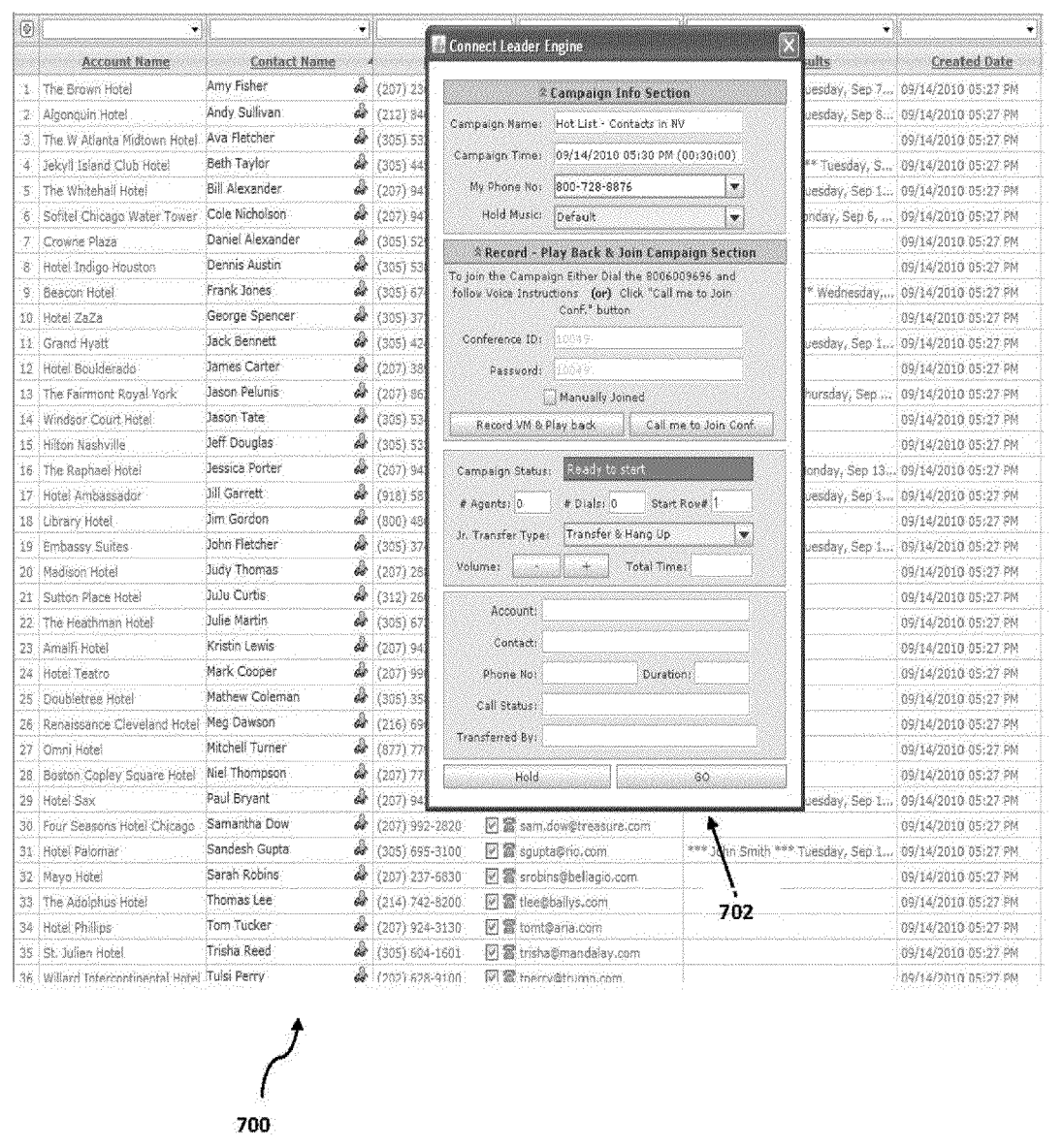

FIG. 10 is an example of a screenview illustrating an interface 650 provided to a talker after the talker joins a campaign using the talker computer 24, but where the talker is yet to join the voice conference bridge using the talker telephone 26. The interface 650 shows various fields (including but not limited to campaign name, campaign start time, campaign status, conference bridge phone number, conference bridge ID, password, number of dialing agents who joined the campaign, number of customer records dialed so far, number of customer calls transferred so far, currently transferred customer record fields, etc) that are appropriate for the talker. In addition, FIG. 11 is an example of a screenview illustrating an interface 700 provided to a talker after the talker joins a campaign using the talker computer 24, and after the talker has joined the voice conference bridge using the talker telephone 26. As shown by FIG. 11, a status window 702 of the interface 700 displays the status of the system 10 as ready to start. It should be noted that based on implementation preferences, the status window 702 could be implemented as a part of the window where the customer list with customer data is shown.

In accordance with the first exemplary embodiment, the campaign becomes ready to start when the following conditions are met: i) the talker joins the campaign through the talker computer 24; ii) the talker is connected to the voice conference bridge through the talker telephone 26; and, iii) one or more dialing agents join the campaign through their computers and are ready to dial customers.

Figure 12:
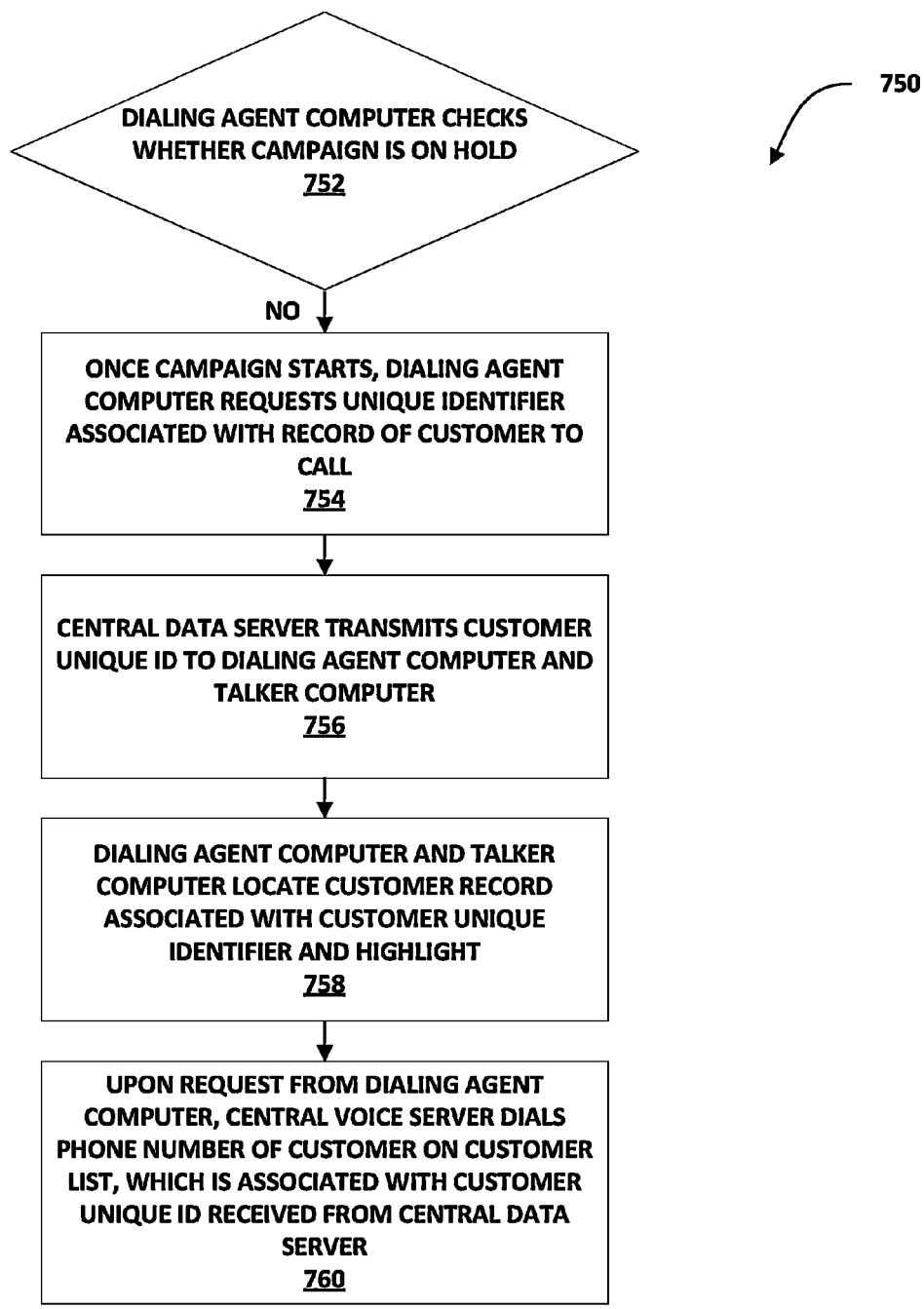
FIG. 12 is a flowchart illustrating actions initiated and performed during initiation of a campaign, in accordance with the first exemplary embodiment of the present invention.

FIG. 12 is a flowchart 750 illustrating actions initiated and performed during initiation of a campaign. While FIG. 12 is provided with regard to a single dialing agent, one having ordinary skill in the art would appreciate that there may be more than one dialing agent in the present system, resulting in the steps of FIG. 12 being performed by each dialing agent. As shown by block 752, the dialing agent computer 24 checks whether the campaign is on hold. Though the campaign is ready to start, the campaign may remain on hold until the talker presses a "Go" button, or performs another step to show that the talker is ready for the campaign to begin. If the talker prefers, before starting the campaign by pressing the "Go" button, the talker may pre-record a voice message by pressing a button provided by the talker software located on the talker computer 24, and requesting one or more dialing agent to play a pre-recorded voice message of the talker whenever the dialing agent encounters a voice mail of the customer as a result of the customer call going to the customer's voice mail.

As shown by block 754, once the campaign starts, meaning that the campaign is not on hold, the dialing agent computer 20, via the dialing agent software, requests from the central data server 100 a unique identifier associated with the record of a specific customer to call. Though the dialing agent is referred here in singular term in order to simplify the description, there could be multiple dialing agents joining the campaign and performing the actions associated with the dialing agent.

As shown by block 756, the central data server 100 responds to the dialing agent computer 20 by transmitting a customer unique identifier to the dialing agent computer 20 and concurrently the central data server 100 transmits the same customer unique identifier to the talker computer 24. The customer unique identifier is specifically designed to be very short in size. For example, the customer unique identifier could be just a row identifier starting from 1 to n (where 'n' is the maximum number of records shown by the customer list).

In an embodiment having multiple dialing agents, to avoid conflicts, the central data server 100 assigns different records in the customer list to different dialing agents. The customer record dialed by the dialing agent is highlighted on the computer screen of the dialing agent as well as the computer screen of the talker.

As shown by block 758, the dialing agent computer 20, via the dialing agent software, locates the customer record associated with the customer unique identifier received from the central data server 100, in the customer list, and highlights that customer record in the tabular list on the screen associated with the dialing agent computer 20, which is viewed by the dialing agent. Concurrently, the talker computer 24, via the talker computer software, locates the same customer record and highlights that customer record in the tabular list on the screen associated with the talker computer 24, which is viewed by the talker.

At any given time, if more than one dialing agent is dialing the customer records in the customer list, all such customer records dialed by different dialing agents are highlighted in the tabular list on the computer screen of the talker. It should be noted that the customer list may or may not be displayed in a tabular list format on the dialing agent computer 20 or the talker computer 24. The talker could review the notes history of customers that are being dialed and get ready to handle the transferred customer call. By following this sequence, the talker is capable of reviewing customer data and being prepared for a transferred customer call prior to receiving the customer call (described hereinbelow). In this manner a meaningful conversation between the taker and the customer may begin right away with transfer of the customer call to the talker, since the talker has previously received and reviewed the customer data well in advance of the call transfer, as was aware of the customer records being dialed. Based on the implementation preferences, it should be noted that certain portions of the customer data that the talker needs to review could be readily shown in the talker computer and additional portion of the customer data could be fetched from a database and shown to the talker upon the talker requesting such portion of data by clicking specific icons or buttons or links. In accordance with the first exemplary embodiment of the present invention, if time permits, the talker could also review the notes history of customers in the list who will be dialed in the near future.

Instead of transferring customer data with a call transfer, as performed by prior systems, the present system and method transfers unique identifiers for highlighting records presently being called and highlighting calls being transferred to the talker, where customers presently being called are highlighted different from customers being transferred to the talker. The process for transferring unique identifiers and highlighting is described in additional detail hereinbelow.

As shown by block 760, upon request from the dialing agent computer 20 to start dialing a specific customer phone number (associated with the unique customer identifier received from the central data server), the central voice server 150 starts dialing that phone number. It should be noted that the objective of the function shown by block 760 is to establish a call between the dialing agent and customer. The dialing agent uses his/her telephone 22 to navigate the phone menus, interactive voice response systems, wrong phone numbers, phone operators, and the like to reach the correct customer. Based on implementation preferences, the dialing agent computer could send a dial request directly to the central voice server 150 or indirectly to the central voice server 150 through the central data server 100. In accordance with the first exemplary embodiment, the dialing agent has not previously joined a voice conference bridge hosted in the central voice server 150. When the dialing agent computer 20 requests the central voice server 150 to start dialing a specific customer phone number (associated with the unique customer ID), the central voice server 150 starts dialing the dialing agent telephone 22 and upon the dialing agent answering the dialing agent telephone 22 the central voice server 150 proceeds to start dialing the customer phone and bridges the customer call with dialing agent. It should be noted that based on the implementation preferences, the dialing agent telephone 22 could be configured to answer automatically (sometimes referred as "auto answering") when the call is made by the central voice server 150 and in which case the dialing agent telephone 22 automatically answers without having the dialing agent answer.

In an alternative embodiment in accordance with the present invention, after the dialing agent joins the campaign through the dialing agent computer 20, the dialing agent joins a voice conference bridge hosted in the central voice server 150 by having the central voice server 150 call the phone number of the dialing agent telephone 22 or by the dialing agent manually calling the conference bridge phone number via use of the dialing agent telephone 22. Upon joining the voice conference bridge, the talker may be listening to on hold music played in the conference bridge or the dialing agent may be simply placed on hold. In the foregoing embodiment, when the dialing agent computer 20 requests the central voice server 150 to start dialing a specific customer phone number (associated with the unique customer ID), the central voice server 150 starts dialing the customer phone number and bridges the customer call with the dialing agent waiting in the conference bridge. One having ordinary skill in the art would know the various techniques that could be used to accomplish the function depicted by block 760.

In an alternative embodiment, the function depicted by block 760 could be implemented by having the central data server 100 make a request to the central voice server 150 to dial the customer phone number (associated with the customer unique identifier) concurrently when the central data server 100 transmits the customer unique identifier to the dialing agent computer 20 and the talker computer 24 as shown by block 756, thereby eliminating the need to have the dialing agent make a request to dial the customer record as shown by the block 760.

In an alternative embodiment, when calling a customer the caller ID displayed could be dynamically customized based on the attributes of the customer phone number. For example but not limited to, based on the geographical area code of the customer phone number the caller ID could be a phone number that belongs to the same area code as the customer area code or an area code closer to the customer's area code.

Figure 13:
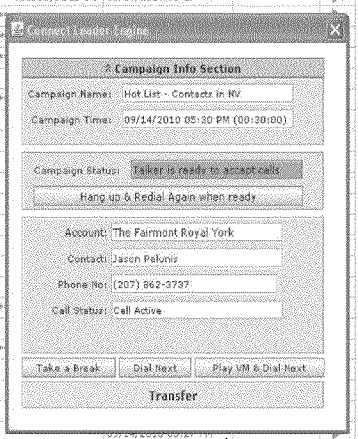
FIG. 13 is an example of a screenview illustrating an interface provided to a dialing agent during the dialing of a customer.

FIG. 13 is an example of a screenview illustrating an interface 780 provided to a dialing agent during the dialing of a customer. As shown by FIG. 13, the customer record of the customer currently being dialed is highlighted 782 so that the dialing agent is aware of which customer is currently being dialed. In addition, an interface window 784 is provided for providing the dialing agent with a status of the current call and for allowing the dialing agent to provide instructions to the dialing agent computer 20. As shown by FIG. 13, the interface window 784 displays the campaign name, campaign time, campaign status, account name, contact, phone number, and call status for the current call. Options to hang up, take a break, and dial the next number are provided to the dialing agent. In addition, an option is provided on the interface window 784 to play a voice message (pre-recorded voice message of the talker that could be played whenever the dialing agent encounters a voice mail of the customer as a result of the customer call going to the customer's voice mail). Further, an option is provided on the interface window 784 to transfer a call to the talker.

Each dialing agent may take a break by clicking a "Take a break" button, in which case the dialing agent software pauses, allowing the dialing agent to take a break until the "Resume" button is clicked. It should be noted that upon clicking the "Take a break" button if there is a customer call already in progress it may not be appropriate to hang up that call and instead the dialing agent may continue to complete such call using the dialing agent telephone 22 and then proceed to take the break. The talker may take a break by pressing the "Hold" button, in which case the talker computer 24 requests the central data server 100 to put the campaign on hold and the central data server 100 puts the campaign on hold allowing the talker to take a break until the "Go" button is pressed. After the campaign goes on hold; i) dialing agents are not allowed to transfer any more calls to the talker and any previously initiated calls should be handled by dialing agents by performing certain pre-defined tasks (hang up, hang up now and redial when the campaign resumes, follow pre-defined script and the like); and, ii) dialing agents are not allowed to initiate new calls. A person having ordinary skill in the art would know that in an alternative embodiment having multiple talkers, when a talker requests to take a break by pressing the "Hold" button, only that particular talker could be given a break (that is, that particular talker is not ready to take the transferred customer call) and the campaign could continue if at least one other talker is ready to take the transferred customer call. The campaign may not be put on hold as long as at least one talker is ready to take the transferred customer call.

Figure 14:
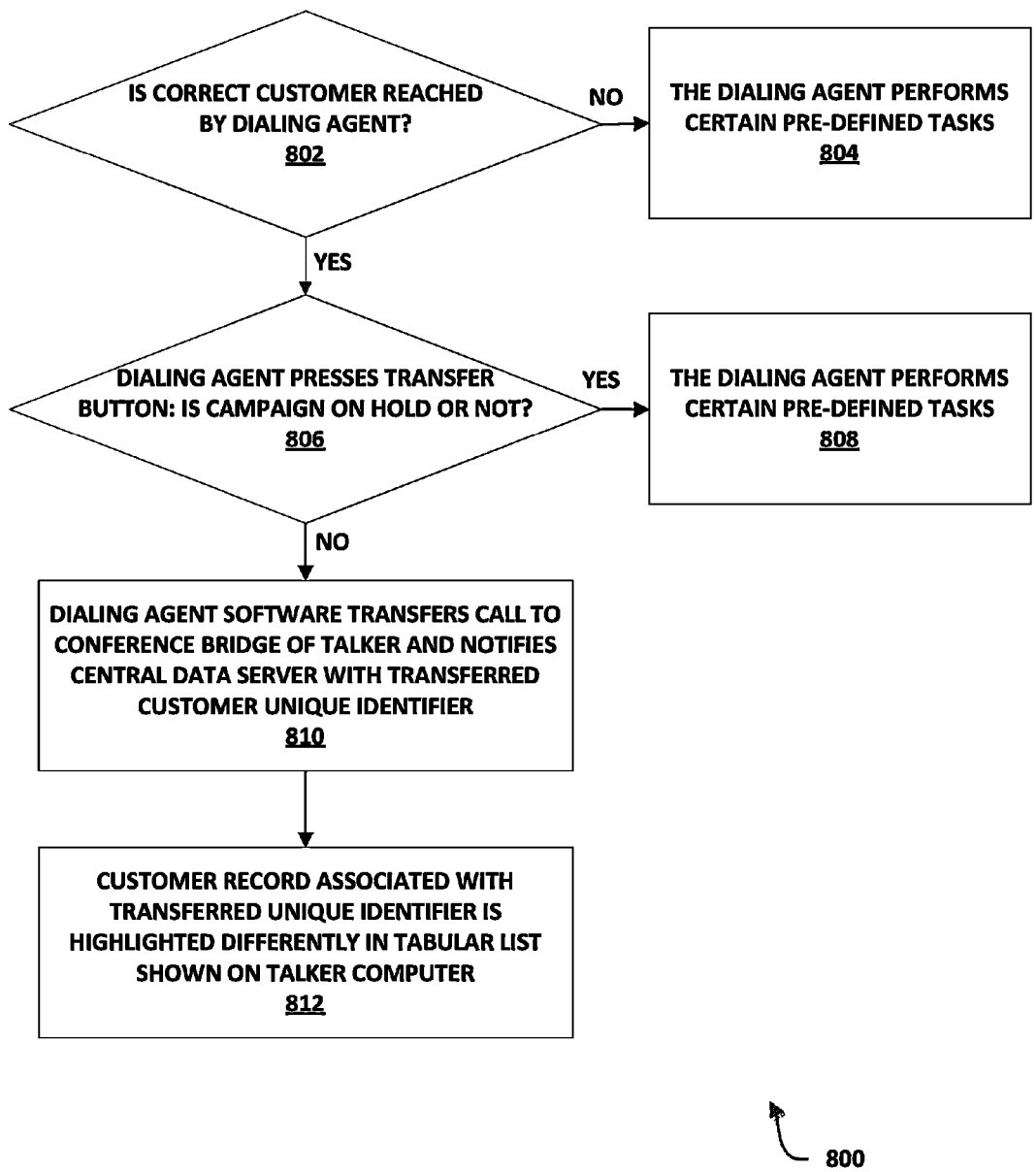
FIG. 14 is a flowchart illustrating a process of handling a call after dialing by the central voice server, in accordance with the first exemplary embodiment of the present invention.

FIG. 14 is a flowchart 800 illustrating a process of handling a call after dialing by the central voice server 150. As shown by block 802, the dialing agent determines whether the correct customer is reached by recognizing live customer voice in the phone call. Based on the implementation of voice recognition technology, the dialing agent may perform the foregoing determination with or without the help of voice recognition technology.

As shown by block 804, upon determining that the correct customer could not be reached, the dialing agent performs certain pre-defined tasks, such as, for example, but not limited to, playing a pre-recorded voice message recorded by the talker previously (if the customer call results in a customer voicemail) or leaving a voice message using the voice of the dialing agent (if the customer call results in a customer voicemail), entering notes against the customer record, and the like.

As shown by block 806, upon determining that the correct customer is reached (by recognizing live customer voice in the phone call), the dialing agent presses the transfer button provided by the dialing agent software, within the interface window 784, and the campaign status is determined to know whether the campaign is on hold or not. The campaign will go on hold for various reasons such as when the talker is busy talking to another customer, when the talker has left the system, and the like. When the campaign is on hold, the customer call cannot be transferred since there is no talker available to talk to the customer. It should be noted that the central data server 100 may keep checking the campaign status continuously and keep updating the campaign status on the screen of the dialing agent. Checking the campaign status may take place by the software of the central data server 100 by continuously monitoring (in short time intervals) to know whether the talker is ready to take the customer call (for example but not limited to, by checking whether the talker is still waiting in the conference bridge and by checking whether the talker computer 24 is in continuous communication with the central data server 100). Campaign status information is also proactively maintained. Such campaign status information could be used to take actions proactively in the system, for example but not limited to, the action described in the succeeding sentence.

Before attempting to transfer the call, if the dialing agent sees the campaign status as being on hold, the dialing agent need not attempt to press the transfer button provided by the dialing agent software and instead proceeds to the step shown by block 808. As shown by block 808, upon determining that the campaign is on hold, the dialing agent performs certain pre-defined tasks such as talking to the customer and scheduling an appointment for the talker and the customer to connect later, and the like.

As shown by block 810, upon determining that the campaign is not on hold, the dialing agent software transfers the call to the conference bridge of the talker and notifies the central data server 100 with the transferred customer unique identifier. Simultaneously, when the call is transferred, the central data server 100 puts the campaign on hold to make sure that another dialing agent cannot transfer another customer to the talker.

Based on implementation preferences, the call transfer function illustrated by block 810 could be implemented by having the dialing agent software send a transfer command directly to the central voice server 150 or indirectly to the central voice server 150 through the central data server 100. In an embodiment where the dialing agent computer 20 sends the customer call transfer request indirectly to the central voice server 150 through the central data server 100, the dialing agent computer 20 could send a request to the central data server 100 to transfer the customer call. Upon receiving such request, the central data server 100 could check whether the campaign is on hold, upon determining that the campaign not on hold, the central data server 100 can proceed to put the campaign on hold, and then transfer the customer call to the conference bridge of the talker (by sending a request to the central voice server 150).

Upon the transfer of the call, the on hold music played to the talker will stop (if on hold music was being played), a short beep sound will be played to alert the talker, and the talker can start the conversation with the customer. When the customer call is transferred, concurrently the central data server 100 receives the transferred customer unique identifier from the dialing agent computer 20 and then transmits to the talker computer 24 the unique identifier of the customer who is being transferred.

In another embodiment of the present invention, upon call transfer request from the dialing agent computer 20 (depicted by the block 810) the central voice server 150 could start playing a pre-recorded voice greeting previously recorded by the talker to the customer called first and then proceed to transfer the customer call to the talker (or such pre-recorded greeting could be played concurrently while the customer call is transferred to talker). The foregoing arrangement could keep the customer engaged while the customer call is being transferred and provide a few extra seconds of time for the talker to get started with the conversation. It should be noted that upon the customer call transfer the talker may hear his/her pre-recorded greeting being played to the customer and waits until his greeting is completed playing and then start the conversation.

As shown by block 812, the customer record associated with the transferred unique identifier is highlighted differently in the tabular list shown on the talker computer 24. The unique identifier of the transferred customer has already been provided to the talker computer 24 when the dialing agent began dialing and the associated customer record was highlighted in the talker computer 24 (ahead of call transfer) to allow the talker to be prepared and during the step depicted by block 810 the same customer unique identifier is sent a second time to notify the talker of which one of the customers is transferred among the few customers being dialed. Since the talker has already reviewed the customer data ahead of call transfer, the talker is able to respond effectively without delay and have a productive conversation. It should be noted that highlighting of the customer record associated with the transferred unique identifier may be performed in many different manners. As an example, the customer record associated with the transferred unique identifier may be highlighted in a different color than the other customer records that are being dialed on the customer list.

In accordance with the present invention, upon dialing agent ending a customer call the dialing agent computer 20 could transmit the customer unique ID and the status of the call being ended to the central data server 100 and central data server 100 notifies the talker computer 24 of the customer unique ID and provides the status of call as having been ended. Upon receiving such information, the talker computer 24 could remove the highlighting of that customer record since the dialing of that customer record has ended (based on implementation preferences, instead of removing the highlighting of that customer record it could be highlighted in a separate color or shade to indicate that customer record has been dialed and such dialing has ended without resulting in a customer call transfer).

Figure 15:
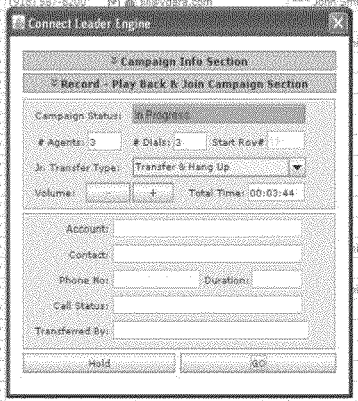
FIG. 15 is an example of a screenview illustrating an interface provided to talker when 3 customer records dialed by dialing agents are highlighted and talker reviewing customer notes history, ahead of call transfer.

FIG. 15 is an example of a screenview illustrating an interface 900 provided to talker when 3 customer records are being dialed by the dialing agents. As shown by FIG. 15, the 3 customer records that are currently being dialed are highlighted 904 to show to the talker which customer records are currently being dialed. Notes history 906 is shown to the talker. In addition, a status window 902 shows the campaign status, number of dialing agents currently dialing, number of dials so far and other relevant information. Status window 902 provides the options to put the campaign on Hold and GO.

Figure 16:
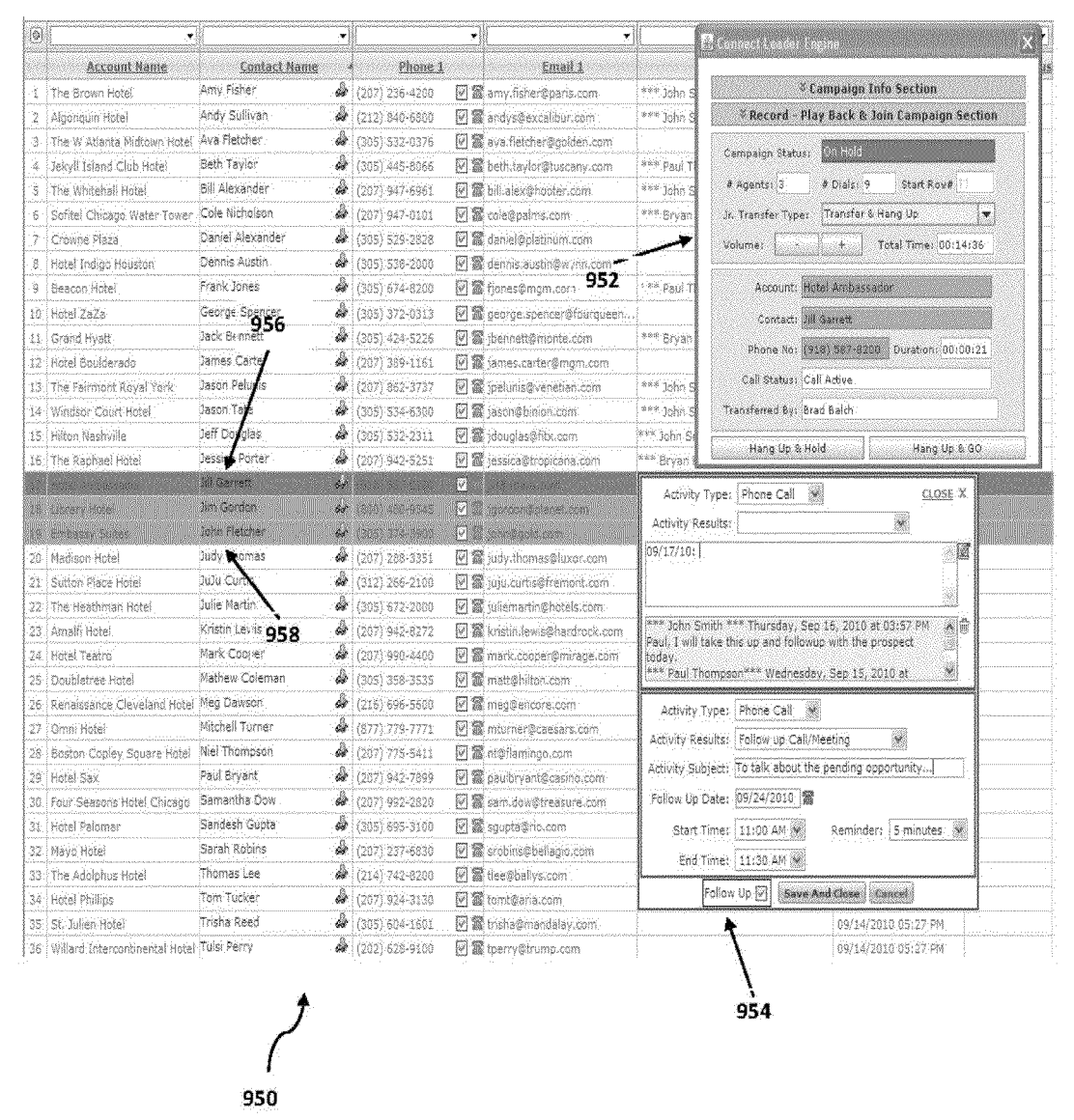

FIG. 16 is an example of a screenview illustrating an interface 950 provided to talker when a customer call is transferred to talker and 2 other customer records are being dialed. As shown by FIG. 16, the transferred customer record is shaded differently 956 to differentiate the transferred customer record from the other 2 customer records 958 that are being dialed. In addition, a status window 952 shows the currently transferred customer record fields (account name, contact name, phone number, etc), campaign status, number of dialing agents currently dialing, number of dials so far and other relevant information. Further, a window 954 is shown where the talker enters notes and schedules a follow up.

In accordance with the present invention, upon the dialing agent transferring a customer call or ending a customer call that did not result in a call transfer, the dialing agent computer 20 could repeat the steps of FIG. 12 to continue to dial the next customer record associated with the next customer unique identifier transmitted by the central data server 100 for dialing. This cycle may continue until the dialing agent exits the campaign or the campaign ends.

In accordance with the present invention, although not a necessity, the dialing agents and talker can update the customer information and notes, and schedule follow up events. For example, the dialing agent might learn that a specific customer no longer works in a business or that the phone number is a wrong phone number or a different contact within a business is the right decision maker, resulting in the dialing agent inserting a new customer record(s) or modifying the customer information to properly reflect current information. In addition, the present system, via the central data server 100, central voice server 150, the taker computer 24, and the dialing agent computer 20, collects various data such as the number of dials made by each dialing agent, the number of calls transferred by each dialing agent, call duration, and the like. A report could be generated based on the collected data.

In accordance with an alternative embodiment of the invention, once the talker makes the decision to end the campaign, the talker closes down the campaign screen on the talker computer 24. Upon such closing down of screen in the talker computer 24 requests the central data server 100 to end the campaign and in turn the central data server 100 notifies the central voice server 150 to end the campaign (and the central voice server 150 ends the campaign by ending the telephone connection of the talker to the voice conference bridge) and changes the campaign status as being ended or closed. This forces all of the dialing agents for that campaign to close down their screens, by having the dialing agent software continuously monitor in short time intervals to know whether the campaign has been closed and upon knowing that the campaign has been closed the dialing agent software could force the dialing agent to close down their screens. When the campaign is started again, the talker has the ability to notify the central data server 100 to start the dialing from a specific customer record in the customer list (instead of starting from the beginning of the customer list).

In an embodiment of the present invention, the central data server 100 could be implemented using Web application server technologies or stand alone server technology that interacts with other components of the system 10 through client-server technology. The central voice server 150 could be implemented using a PBX system such as Asterisk. Dialing agent software and talker software may be implemented using stand-alone code that communicates with other components of the system through client-server technology, or using web browser Ajax technology or web browser with plug-in, or using a combination of Web technology and automatic delivery of code from a Web server to browsers using technologies for example but not limited to Java or ActiveX. The system may or may not integrate with a third party customer relationship management ("CRM") to implement the functions of the central data server, dialing agent software, and talker software. Communication between the central voice server 150 and other components of the system 10 may or may not go through the central data server 100. Based on implementation preferences, communication between any two components of the system 10 could be accomplished using various mechanisms such as but not limited to Ethernet, Internet, TCP/IP, and shared memory based communication, and shared storage based communication. Further, based on implementation preferences, communication between any two components of the system 10 could be accomplished using messages with variations in content. For example, upon customer call transfer the central data server 100 could transmit to the talker computer 24 a portion of the customer record that could be used to uniquely identify the transferred customer record in the talker computer 24 instead transmitting the unique customer identifier associated with the transferred customer. Based on implementation preferences, the components of the system may or may not use a local or server based database system to store and retrieve customer lists and data.

Based on the type of technology used for communication between any two components of the system 10 and choice of the method used for embodying the current invention, a component may act only as a client or may act only a server or may act as both a client and a server. Based on implementation preferences, the functions performed by each component of the system (including but not limited to, central data server, central voice server, talker software, and dialing agent software) could be restructured by removing a specific function (whole function or a portion of a function) from one component and delegating such function to be performed by another component. In an embodiment, a portion of the function performed by the central data server 100 that involves the transmission of the customer list to one or more component of the system 10 (for example but not limited to having dialing agent computer 20 and talker computer 24) directly retrieve the customer list from a file or database that is accessible and limit the function of the central data server 100 to provide the necessary data (such as but not limited to, campaign status) for coordination among the components of the system 10. In an alternative embodiment, the whole function performed by the central data server 100 could be delegated by having the dialing agent computer 20, talker computer 24, and central voice server 150 communicate among themselves and coordinate among themselves to accomplish the overall function of system 10 of the present invention and thereby eliminating the need to have the central data server 100 as part of the system 10. To accomplish the foregoing example, techniques such as but not limited to communication and coordination among multiple components of system 10 (including but not limited to dialing agent computer 20, talker computer 24, and central voice server 150) via shared memory or local memory in each component that is being synchronized with the local memory of the other components. It should be noted that communication via shared memory is a possibility if the different components of system 10 are implemented to be located in a computer (including but not limited a server, cluster of computers, computer network, or the like) that makes such shared memory available for access by multiple components. Such implementation where the different components of the system 10 (such as but not limited to dialing agent computer 20 and talker computer 24) to be located in a computer (that provides shared memory access among the components) could be accomplished with the technique that is described herein below.

It should be noted that the dialing agent computer 20, talker computer 24, and any other computer that requires the interaction with a user in the system 10 could be implemented by having a computer terminal that provides access to a remote computer where the remote computer performs the function of the computer. In such mechanism, certain resources (including but not limited to screen and peripheral device) and events of the remote computer are mapped to the computer terminal. The foregoing implementation could be accomplished using technologies, such as but not limited to, remote desktop client, remote desktop connection, remote desktop server, computer terminal, terminal server, and the like. For example, the dialing agent computer 20 could be a computer terminal that has remote desktop client software which connects to the remote desktop server (where dialing agent software is located) and the dialing agent is allowed to see the dialing agent software interface (and interact with the dialing agent software) located in the remote desktop server via the computer terminal. As a way of another example, similar to the foregoing example, the talker computer 24 could be a computer terminal allowing the talker to see and interact with the talker software located in the remote desktop server. It should be noted that by using the foregoing technique it is possible to have the dialing agent software, talker software, the central data server 100, and the central voice server be located in the same server (and based on the implementation preferences such components may or may be implemented as software modules in the server). Based on the implementation preferences, such server could provide shared memory access to the different components of the system for communication and coordination.

Further, one component of the system could send and receive information directly from the other component or indirectly through one or more components. For example, based on implementation preferences, the call transfer function depicted by the block 810 (in FIG. 14) could be implemented by having the dialing agent software send a call transfer request to the central voice server 150 directly, or the same call transfer function could be implemented by having the dialing agent software send a call transfer request to the central data server 100 and in turn the central data server 100 send a call transfer request to the central voice server 150. As a way of another example, in the step illustrated by block 504 (in FIG. 6) instead of transmitting the customer list and associated customer data to the dialing agent computer 20 and/or talker computer 24, the central data server 100 may transmit only customer list information and the source (for example, but not limited to, a specific database) from where to get the associated customer data and the dialing agent computer 20 and/or talker computer 24 may get the customer data from the source specified by the central data server 100.

Based on the implementation preferences, each component of the system 10 could be a logical component that is implemented by having multiple instances of the component working with or without coordination among such instances. Such implementation may be needed to improve the attributes of the system 10, such as but not limited to, the scalability, reliability, redundancy, and availability. Some of the techniques that could be used in such implementation could be, including but not limited to, clustering, load balancing, distributed computing and cloud computing). For example, the central data server 100 could be implemented by having more than one computer configured to work as a cluster for the purposes of, including but not limited to, balancing the work load among the computers in the cluster, delegating the function performed by a non-working computer (when a computer in the cluster is not working due to failure or shut down intentionally by maintenance personnel for maintenance) to other computers in the cluster in order to maintain high availability, and keep the overall cost of the central data server 100. It should be noted when a component of system 10 is implemented by having multiple instances (as described herein above), one or more instances may or may not share the same processor, memory, storage, and the like. A person having ordinary skill in the art would understand the various forms of technologies and techniques that could be used to embody the invention.

It should be noted that the highlighting of customer records, as described herein, may be used to highlight the dialing agent screen and the talker screen to differentiate the customers who are being dialed, who is currently transferred, who were previously transferred, who were unsuccessfully dialed previously that did not result in a call transfer, to whom dialing agents have successfully played a pre-recorded voice message previously recorded by talker, and to represent other customer status. In addition, highlighting may be performed by one or more of many different methods such as, but not limited to, changing colors, blinking, circling, shading, changing the border around the customer information, showing the customer information in specific area of the screen, and pointing to customer information shown in the computer.

In addition to the abovementioned, in accordance with the first embodiment, since a specific talker is pre-selected for a given campaign, at the time of call transfer the system knows the talker ahead of time and the system does not have to look for an available talker at the time of call transfer. Hence, the speed of call transfer is faster.

Various components of the present system may be designed to update each other continuously (with short time intervals between updates) and such updates could include, but are not limited to, updates of information that need to be exchanged between the components and the information about whether the connectivity between them is healthy. Such updates could be implemented by having one component poll the other component continuously (with short time intervals between the polling) to provide updates as well as receive updates at the same time. If the technology used for implementation permits, such updates may be performed asynchronously by having a component send updates to other component(s) only when there is a change of information that needs to be exchanged. It should be noted that the present system may be implemented to perform security checks at various steps to ensure proper authentication of user of the system and appropriate authorization to access various functions of the system and/or access or update various portions of data in the system.

It is also beneficial to have a policy for handling customer calls when the talker is busy. In accordance with an alternative embodiment of the invention, once a call is transferred, the talker will be busy in attending the call transferred to the conference bridge (where the talker is waiting readily) and the campaign data server software will put the campaign on a hold status. After the campaign goes into a hold status, any other call currently in progress between the dialing agent and the customer could be dropped and, based on the option, redialed again when the campaign resumes or the dialing agent may proceed with the call and talk to the customer to arrange a scheduled time for the talker to contact the customer directly at a later time.

In accordance with another alternative embodiment of the invention, besides highlighting the customer record that is being dialed in both the dialing agent computer 20 and the talker computer 24, the system could continuously exchange among the talker computer 24 and the dialing agent computer 20 the incremental updates made to customer records. To accomplish such exchange of updates without compromising the speed of call transfer, the exchange of incremental updates of customer data could be performed at a lower priority and the task of transferring the call (and the associated customer's unique identifier) could be performed at a higher priority.

In accordance with a further alternative embodiment of the invention, instead of using a conference bridge as a mechanism in the central voice server 150, the system could use other mechanisms that allow the talker to wait readily to handle the transferred customer call. Such alternative mechanisms could include, but are not limited to, queue, parking lot, and the like. A person having ordinary skill in the art of the present invention would understand the various types of mechanisms in the central voice server that could be used in a system embodying the present invention.

While the abovementioned did mention that more than one dialing agent and more than one talker may be provided within the present system and method, in another embodiment of the present invention, the system could be implemented to have more than one talker wait in a queue (or alternative mechanisms) to handle the transferred customer calls. This configuration reduces the chances of needing the dialing agent to handle the customer call himself/herself due to the talker becoming busy. The higher the number of talkers available, the lesser the chance of not having a talker available to handle the transferred customer call and, in turn, the lesser the chance of the dialing agent needing to handle the customer call himself/herself. If more than one talker is waiting to handle the transferred customer call the central data server 100 may need to select one of the available talkers during the time of call transfer. A delay associated with such selection of talker during the time of call transfer could be minimized by having the system pre-select one of the available talkers to handle the next transferred call. Such pre-selection process could be executed on a continuous basis whenever the previously preselected talker becomes busy (and keep maintaining the designated talker to handle the next transferred call).

Further, multiple people may participate in a transferred customer call. For example, the present system may be implemented to have one or more individuals join the customer call along with the talker. Such additional individual(s) may participate in a listen only mode, participate in a listening and talking mode, or participate in a whisper mode in which the talker could hear such individual's voice but not the customer. Participation of additional individuals could be necessary for training purposes or assisting the customer along with the talker. It should be noted that one or more persons could participate (in various modes such as listen only, whispering to the one or more participants, or listening and talking to everyone in the call) in the call between the dialing agent and customer for the purposes of training and coaching.

In an alternative embodiment of the present invention, the system could be implemented by 1) automating all or a portion of the dialing agent's function to navigate a customer phone call (through including, but limited to, phone menus and voicemails) until reaching the live customer, by using techniques such as but not limited to, playing the correct sequence of digits (along with the appropriate delays in between digits) that were stored as part of the customer data, and 2) having the system recognize whether a live human voice is encountered in a phone call. For certain customer records where the navigation function could be automated fully by having the system perform the navigation function, the system could dial the customer phone number, navigate the phone call (through but not limited to phone menus and voicemails), and upon the live customer picking up the call, recognize the live human voice and transfer that call to the talker. For the customer records where the phone call navigation could be fully performed by the system, the foregoing arrangement could eliminate the need to have the human dialing agent by having the system do the same phone call navigation work. It should be noted that if the system is performing the phone call navigation function fully for certain customer records without having the human dialing agent involvement there is no need to have a separate dialing agent computer and no need to display the customer record that is being dialed in the dialing agent computer screen (and instead the dialing agent software function could be modified to operate in a non-interactive mode and implemented as a module in the central data server). During such customer call transfer (followed by phone call navigation by the system) if the talker is busy, based on implementation preferences, such call could be transferred to one of the secondary talker(s) waiting to handle such calls. Secondary talkers could be individuals with skills equal to, more, or less skilled than the talker based on the requirement. The customer records for which the phone call navigation function could not be automated fully by having the system perform the phone call navigation function, the human dialing agent is required for phone call navigation and the system could be used to assist the human dialing agent by automating a certain portion of the customer call navigation. Each customer record could be marked as whether the phone call navigation is fully possible by the system or not. Based on the mix of customer records (navigation by system fully possible versus navigation requiring human dialing agents) there is possibility to have no human dialing agents or a lesser number of human dialing agents working alongside of the system performing the function of the dialing agent(s) in a campaign.

Based on implementation preferences in the foregoing embodiment, the system, a user of the system, or a combination of the user and the system, could update the customer record with information including but not limited to 1) whether the customer phone number is a direct dial phone number or goes to a phone menu(s) that could be navigated by pressing specific digits, and 2) if dialing the phone number goes to a phone menu, the digits such as menu options or extension number that need be pressed (along with the delay that need to be provided between each such digits) to navigate through each phone menu that may be encountered, until the phone call ringing the correct target customer. It should be noted that while the dialing agent is navigating phone menus during a customer call one of the components of the system could be implemented to learn and automatically capture the digits pressed by the dialing agent (along with the delay between digits) and store that information in the associated customer record. While the dialing agent is on a customer call, the system could assist the dialing agent to identify whether the call is picked by a live human being or a phone menu, and upon encountering a phone menu the system could assist the dialing agent by automatically playing the digits required to navigate that phone menu. In a customer call that is designated, a system could navigate fully until reaching the live person. If the customer call encounters a live human voice instead of an expected phone menu the system could recognize that live human voice and transfer the call to the talker (or, based on implementation preference, transfer that call to an available dialing agent to navigate further until the correct live target customer is reached, upon which the dialing agent will further transfer the call to the talker). A person having ordinary skill in the art would know the various techniques that could be used in the foregoing embodiment.

In accordance with the present invention, there could be many variations on (including, but not limited to) how the customer list and data are created, campaign is created, campaign is started, what portion of the customer list and customer data are transmitted to the dialing agent computer and talker computer and when transmitted, and whether the customer records are allowed to undergo changes while the campaign is in progress. Further, there could be many variations in (including, but not limited to) whether the customer list is finalized and transmitted to the dialing agent computer and talker computer before starting the campaign, or whether the customer list is generated dynamically (in a small batch of records or one customer record at a time) based on specific customer record selection logic and transmitted to the dialing agent and talker computer while the campaign is in progress. At any given time, the list of customer records and customer data shown on the dialing agent computer may or may not be the same as that shown in the talker computer. Notwithstanding the above variations, it should be emphasized that (1) when the dialing agent(s) is dialing a customer record(s), concurrently the same customer record(s) is highlighted in the talker computer (to accomplish this, the talker computer should receive the customer record(s) dialed by the dialing agent simultaneously at the same time or before when the customer record(s) is highlighted to show that customer record(s) is being dialed), and (2) when a customer call is transferred by the dialing agent the customer record associated with the transferred customer call is highlighted differently on the talker computer to allow the talker to differentiate the customer record whose call is transferred versus the customer record(s) that is being dialed. By following this sequence, the talker is capable of reviewing customer data and being prepared for a transferred customer call prior to receiving such transferred customer call.

It should be noted that whenever this document refers to a "customer record" the fields associated with a specific customer record shown to the dialing agent could vary from the fields associated with the same customer record shown to talker. It should be noted that whenever this document refers to "concurrently", "simultaneously", "in real time" or "at the same time" or other terminology referring similar meaning should be interpreted by taking into account reasonable delays associated with speed of computers, phone systems and networks.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

I claim:

1. A system for handling call transfer from being between a customer and a dialing agent to being between the customer and a talker, wherein the system comprises a central data server, a dialing agent computer, and a talker computer, the system further comprising:
   the central data server having a memory, and a processor configured by the memory to provide a batch notification that enables the talker computer to identify a batch of one or more customer records, for dialing in the near future;
   the dialing agent computer having a memory, and a processor configured by the memory to provide a connected notification that a customer that has been called has been connected, referred to herein as a connected customer, via a call, wherein the dialing agent computer is used by a dialing agent, and wherein a customer record of the connected customer is one of the batch;
   the talker computer having a memory, and a processor configured by the memory to perform the steps of:
      receiving the batch notification that enables the talker computer to identify the batch of one or more customer record; and
      receiving an identify notification that enables the talker computer to identify the customer record associated with the connected customer, for the purposes of distinguishing the connected customer record on the talker computer after the connected customer has been connected to the dialing agent, wherein the talker computer is used by the talker and wherein the customer record of the connected customer is one of the batch;
   wherein the central data server further performs the steps of:
      receiving the connected notification confirming that the connected customer that has been called has been connected; and
      after the dialing agent computer acknowledges connection to the customer, providing the identify notification that enables the talker computer to distinguish the customer record associated with the connected customer.

2. The system of claim 1, wherein the processor of the central data server is further configured to select one or more customer for dialing in the near future, wherein the one or more customer is associated with the batch.

3. The system of claim 1, wherein size of the batch identified in the talker computer is customizable by a user of the system, and wherein based on the foregoing customization the central data server provides an appropriate notification that enables the talker computer to identify the batch of appropriate size.

4. The system of claim 1, wherein the processor of the central data server is further configured to select at least one customer that is being called or to be called next, referred to herein as a selected customer, wherein a customer record of the selected customer is part of the batch.

5. The system of claim 4, wherein the processor of the central data server further performs the step of providing a selected notification that enables the talker computer to distinguish the selected customer, wherein the customer record of the selected customer is part of the batch.

6. The system of claim 5, wherein the talker computer further performs the step of receiving the selected notification that enables the talker computer to distinguish the selected customer, wherein the customer record of the selected customer is one of the batch.

7. The system of claim 5, wherein the talker computer receives the selected notification, concurrently during or after the receipt of the batch notification.

8. The system of claim 1, wherein at least one of the customer records associated with the batch is selected to be part of the batch based on information, referred to herein as "prioritization information", located in one or more fields associated with the customer record, wherein the prioritization information is used to determine the order of the customer record for calling.

9. The system of claim 4, wherein the talker computer enables updating of one or more fields, referred to herein as "talker update fields", of a customer record identified as part of the batch, wherein one or more talker update fields is used to determine the customer record associated with the next selected customer.

10. The system of claim 9, wherein at least one of the customer records associated with the batch is selected to be part of the batch based on information, referred to herein as "prioritization information", located in one or more fields associated with the customer record, wherein the prioritization information is used to determine the order of the customer record for calling, wherein at least one of the talker update fields is part of the fields containing the prioritization information.

11. The system of claim 9, wherein at least one of the talker update fields of the customer record is a when to call field that specifies whether to call the customer associated with the customer record during a specific time period or not to call during a specific time period, wherein the when to call field is used to determine the customer record associated with the next selected customer, and wherein the information contained in the when to call field may be stored in multiple attributes of the customer record.

12. The system of claim 8, wherein the dialing agent computer enables updating of one or more fields, referred to herein as "dialing agent update fields" of the customer record associated with the connected customer, wherein at least one of the dialing agent update fields is part of the fields containing the prioritization information.

13. The system of claim 1, wherein the batch notification is a group of one or more customer records.

14. The system of claim 1, wherein the batch notification is a group of one or more customer identifications, wherein each customer identification is associated with at least one of the customer records.

15. The system of claim 1, wherein distinguishing the customer record includes the step of highlighting the customer record.

16. The system of claim 1, wherein the system further comprising a computer, referred to herein as a third party call participant computer, used by a user, referred to herein as a third party call participant, of the system that participates in the call between the customer and the dialing agent or between the customer and the talker, having a memory, and a processor configured by the memory to provide a request participation notification that the third party call participant has requested to participate in the call between the customer and the dialing agent or between the customer and the talker, wherein the dialing agent or the talker that is on the call with the customer is referred to herein as a call attendant; and
   wherein the central data server further performs the steps of:
      receiving the request participation notification from the third party call participant computer that the third party call participant has requested to participate in the call between the customer and the call attendant; and
      after the third party call participant has requested to participate in the call between the customer and the call attendant, providing a participate notification that enables the third party call participant to participate in the call between the customer and the call attendant.

17. The system of claim 16, wherein the system further comprising a central voice server for providing voice communication between the customer and the call attendant, wherein the central voice server enables the third party call participant to participate in the call between the customer and the call attendant.

18. The system of claim 17, wherein the central voice server receives the participate notification that enables the third party call participant to participate in the call between the customer and the call attendant.

19. The system of claim 16, wherein the third party call participant is connected to the call between the call attendant and the customer in a mode, referred to herein as a listen only mode, that enables the third party call participant to only listen to both the call attendant and the customer, wherein in the listen only mode the third party call participant may participate in the call with or without knowledge of the call attendant or the customer.

20. The system of claim 16, wherein the third party call participant is connected to the call between the call attendant and the customer in a mode, referred to herein as a listen and talk mode, that enables the third party call participant to listen as well as talk to both the call attendant and the customer, wherein in the listen and talk mode the third party call participant, call attendant, and the customer all or some may have knowledge of presence of others in the call.

21. The system of claim 16, wherein the third party call participant is connected to the call between the call attendant and the customer in a mode, referred to herein as a whisper mode, that enables the third party call participant to listen to both the call attendant and the customer, but talk to only the call attendant, wherein in the whisper mode the third party call participant may participate in the call without knowledge of the customer.

22. A method for handling call transfer from being between a customer and a dialing agent to being between the customer and a talker, comprising the steps of:
   providing a batch notification that enables identification of a batch of one or more customer records, for dialing in the near future;
   providing a connected notification that a customer that has been called has been connected, referred to herein as a connected customer, via a call, wherein a customer record of the connected customer is one of the batch;
   receiving the batch notification that enables identification of the batch of one or more customer record; and
   receiving an identify notification that enables identification of the customer record associated with the connected customer, for the purposes of distinguishing the connected customer record after the connected customer has been connected to the dialing agent, wherein the customer record of the connected customer is one of the batch;
   receiving the connected notification confirming that the connected customer that has been called has been connected; and
   after providing the connected notification, providing the identify notification that enables distinguishing the customer record associated with the connected customer.

23. The method of claim 22, further comprising the step of selecting one or more customer for dialing in the near future, wherein the one or more customer is associated with the batch.

24. The method of claim 22, wherein the size of the batch identified is customizable by a user of the method, and wherein based on the foregoing customization an appropriate notification is provided that enables the identification of the batch of appropriate size.

25. The method of claim 22, further comprising the step of selecting at least one customer that is being called or to be called next, referred to herein as a selected customer, wherein a customer record of the selected customer is part of the batch.

26. The method of claim 25, further comprising the step of providing a selected notification that enables distinguishing the selected customer, wherein the customer record of the selected customer is part of the batch.

27. The method of claim 26, further comprising the step of receiving the selected notification, wherein the customer record of the selected customer is one of the batch.

28. The method of claim 26, wherein receiving the selected notification happens concurrently during or after the receipt of the batch notification.

29. The method of claim 22, wherein at least one of the customer records associated with the batch is selected to be part of the batch based on information, referred to herein as "prioritization information", located in one or more fields associated with the customer record, wherein the prioritization information is used to determine the order of the customer record for calling.

30. The method of claim 25, further comprising the step of updating of one or more fields, referred to herein as "talker update fields", of a customer record identified as part of the batch, wherein one or more talker update fields is used to determine the customer record associated with the next selected customer.

31. The method of claim 30, wherein at least one of the customer records associated with the batch is selected to be part of the batch based on information, referred to herein as "prioritization information", located in one or more fields associated with the customer record, wherein the prioritization information is used to determine the order of the customer record for calling, wherein at least one of the talker update fields is part of the fields containing the prioritization information.

32. The method of claim 30, wherein at least one of the talker update fields of the customer record is a when to call field that specifies whether to call the customer associated with the customer record during a specific time period or not to call during a specific time period, wherein the when to call field is used to determine the customer record associated with the next selected customer, and wherein the information contained in the when to call field may be stored in multiple attributes of the customer record.

33. The method of claim 29, further comprising the step of updating of one or more fields, referred to herein as "dialing agent update fields" of the customer record associated with the connected customer, wherein at least one of the dialing agent update fields is part of the fields containing the prioritization information.

34. The method of claim 22, wherein the batch notification is a group of one or more customer records.

35. The method of claim 22, wherein the batch notification is a group of one or more customer identifications, wherein each customer identification is associated with at least one of the customer records.

36. The method of claim 22, wherein distinguishing the customer record includes the step of highlighting the customer record.

37. The method of claim 22, wherein a user, referred to herein as a third party call participant, participates in the call between the customer and the dialing agent or between the customer and the talker, and wherein the method further comprises the steps of:

provide a request participation notification that the third party call participant has requested to participate in the call between the customer and the dialing agent or between the customer and the talker, wherein the dialing agent or the talker that is on the call with the customer is referred to herein as a call attendant;

receiving the request participation notification that the third party call participant has requested to participate in the call between the customer and the call attendant; and after the third party call participant has requested to participate in the call between the customer and the call attendant, providing a participate notification that enables the third party call participant to participate in the call between the customer and the call attendant.

38. The method of claim 37, further comprising the step of providing voice communication between the customer and the call attendant, wherein the third party call participant is enabled to participate in the call between the customer and the call attendant.

39. The method of claim 37, further comprising the step of receiving the participate notification that enables the third party call participant to participate in the call between the customer and the call attendant.

40. The method of claim 37, wherein the third party call participant is connected to the call between the call attendant and the customer in a mode, referred to herein as a listen only mode, that enables the third party call participant to only listen to both the call attendant and the customer, wherein in the listen only mode the third party call participant may participate in the call with or without knowledge of the call attendant or the customer.

41. The method of claim 37, wherein the third party call participant is connected to the call between the call attendant and the customer in a mode, referred to herein as a listen and talk mode, that enables the third party call participant to listen as well as talk to both the call attendant and the customer, wherein in the listen and talk mode the third party call participant, call attendant, and the customer all or some may have knowledge of presence of others in the call.

42. The method of claim 37, wherein the third party call participant is connected to the call between the call attendant and the customer in a mode, referred to herein as a whisper mode, that enables the third party call participant to listen to both the call attendant and the customer, but talk to only the call attendant, wherein in the whisper mode the third party call participant may participate in the call without knowledge of the customer.

43. A system for calling a customer, comprising:
a computer having a memory, and a processor configured by the memory to receive a batch notification that enables the computer to identify a batch of one or more customer records in the computer, for calling in the near future, and to receive a calling notification that enables the computer to distinguish a customer that is being called or to be called next, referred to herein as a calling customer, via a call, wherein a customer record associated with the calling customer is one of the batch; and
a central data server having a memory, and a processor configured by the memory to perform the steps of:
providing the batch notification that enables the computer to identify the batch of one or more customer records; and
providing the calling notification that enables the computer to distinguish the calling customer,
wherein the processor of the central data server is further configured to select one or more customer for dialing in the near future, wherein the one or more customer is associated with the batch.

44. The system of claim 43, wherein the size of the batch identified in the computer is customizable by a user of the system, and wherein based on the foregoing customization the central data server provides an appropriate notification that enables the computer to identify the batch of appropriate size.

45. The system of claim 43, wherein the computer receives the calling notification, concurrently during or after the receipt of the batch notification.

46. The system of claim 43, wherein at least one of the customer records associated with the batch is selected to be part of the batch based on information, referred to herein as "prioritization information", located in one or more fields associated with the customer record, wherein the prioritization information is used to determine the order of the customer record for calling.

47. The system of claim 43, wherein the computer enables updating of one or more fields, referred to herein as "user update fields", of a customer record identified as part of the batch, and wherein one or more user update fields is used to determine the customer record associated with the next calling customer.

48. The system of claim 47, wherein at least one of the customer records associated with the batch is selected to be part of the batch based on information, referred to herein as "prioritization information", located in one or more fields associated with the customer record, wherein the prioritization information is used to determine the order of the customer record for calling, wherein at least one of the user update fields is part of the fields containing the prioritization information.

49. The system of claim 47, wherein at least one of the user update fields of the customer record is a when to call field that specifies whether to call the customer associated with the customer record during a specific time period or not to call during a specific time period, wherein the when to call field is used to determine the customer record associated with the next calling customer, and wherein the information contained in the when to call field may be stored in multiple attributes of the customer record.

50. The system of claim 43, wherein the computer is used by a first user, referred to herein as a call agent, and the system further comprising:
a second computer, referred to herein as a third party call participant computer, used by a second user, referred to herein as a third party call participant, of the system that participates in the call between the customer and the call agent, having a memory, and a processor configured by the memory to provide a request participation notification that the third party call participant has requested to participate in the call between the customer and call agent; and a central data server having a memory, and a processor configured by the memory to perform the steps of: receiving the request participation notification from the third party call participant computer that the third party call participant has requested to participate in the call between the call agent and the customer; and providing a participate notification that enables the third party call participant to participate in the call between the call agent and the customer.

51. The system of claim 50, wherein the system further comprising a central voice server for providing voice communication between the call agent and the customer, wherein the central voice server enables the third party call participant to participate in the call between the call agent and the customer.

52. The system of claim 51, wherein the central voice server receives the participate notification that enables the third party call participant to participate in the call between the call agent and the customer.

53. The system of claim 50, wherein the third party call participant is connected to the call between the call agent and the customer in a mode, referred to herein as a listen only mode, that enables the third party call participant to only listen to both the call agent and the customer, wherein in the listen only mode the third party call participant may participate in the call with or without knowledge of the call agent or the customer.

54. The system of claim 50, wherein the third party call participant is connected to the call between the call agent and the customer in a mode, referred to herein as a listen and talk mode, that enables the third party call participant to listen as well as talk to both the call agent and the customer, wherein in the listen and talk mode the third party call participant, call agent, and the customer all or some may have knowledge of presence of others in the call.

55. The system of claim 50, wherein the third party call participant is connected to the call between the call agent and the customer in a mode, referred to herein as a whisper mode, that enables the third party call participant to listen to both the call agent and the customer, but talk to only the call agent, wherein in the whisper mode the third party call participant may participate in the call without knowledge of the customer.

56. A method for calling a customer, comprising the steps of:
   receiving a batch notification that enables identification of a batch of one or more customer records, for calling in the near future;
   receiving a calling notification that enables distinguishing a customer that is being called or to be called next, referred to herein as a calling customer, via a call, wherein a customer record associated with the calling customer is one of the batch;
   providing the batch notification that enables identification of the batch of one or more customer records;
   selecting one or more customer for dialing in the near future, wherein the one more customer is associated with the batch; and
   providing the calling notification that enables distinguishing the calling customer.

57. The method of claim 56, wherein the size of the batch identified is customizable by a user of the method, and wherein based on the foregoing customization the method further comprises the step of providing an appropriate notification that enables identification of the batch of appropriate size.

58. The method of claim 56, wherein the calling notification is received concurrently during or after the receipt of the batch notification.

59. The method of claim 56, wherein at least one of the customer records associated with the batch is selected to be part of the batch based on information, referred to herein as "prioritization information", located in one or more fields associated with the customer record, wherein the prioritization information is used to determine the order of the customer record for calling.

60. The method of claim 56, further comprising the step of enabling updating of one or more fields, referred to herein as "user update fields", of a customer record identified as part of the batch, and wherein one or more user update fields is used to determine the customer record associated with the next calling customer.

61. The method of claim 60, wherein at least one of the customer records associated with the batch is selected to be part of the batch based on information, referred to herein as "prioritization information", located in one or more fields associated with the customer record, wherein the prioritization information is used to determine the order of the customer record for calling, wherein at least one of the user update fields is part of the fields containing the prioritization information.

62. The method of claim 60, wherein at least one of the user update fields of the customer record is a when to call field that specifies whether to call the customer associated with the customer record during a specific time period or not to call during a specific time period, wherein the when to call field is used to determine the customer record associated with the next calling customer, and wherein the information contained in the when to call field may be stored in multiple attributes of the customer record.

63. The method of claim 56, wherein the method is used by a first user, referred to herein as a call agent and a second user, referred to herein as a third party call participant, and the method further comprises the steps of: providing a request participation notification that the third party call participant has requested to participate in the call between the customer and call agent; receiving the request participation notification that the third party call participant has requested to participate in the call between the call agent and the customer; and
   providing a participate notification that enables the third party call participant to participate in the call between the call agent and the customer.

64. The method of claim 63, wherein the method further comprises the step of enabling the third party call participant to participate in the call between the call agent and the customer.

65. The method of claim 63, further comprising the step of receiving the participate notification that enables the third party call participant to participate in the call between the call agent and the customer.

66. The method of claim 63, wherein the third party call participant is connected to the call between the call agent and the customer in a mode, referred to herein as a listen only mode, that enables the third party call participant to only listen to both the call agent and the customer, wherein in the listen only mode the third party call participant may participate in the call with or without knowledge of the call agent or the customer.

67. The method of claim 63, wherein the third party call participant is connected to the call between the call agent and the customer in a mode, referred to herein as a listen and talk mode, that enables the third party call participant to listen as well as talk to both the call agent and the customer, wherein in the listen and talk mode the third party call participant, call agent, and the customer all or some may have knowledge of presence of others in the call.

68. The method of claim 63, wherein the third party call participant is connected to the call between the call agent and the customer in a mode, referred to herein as a whisper mode, that enables the third party call participant to listen to both the call agent and the customer, but talk to only the call agent, wherein in the whisper mode the third party call participant may participate in the call without knowledge of the customer.

* * * * *